(12) United States Patent
Sadler et al.

(10) Patent No.: US 11,831,957 B2
(45) Date of Patent: Nov. 28, 2023

(54) SYSTEM AND METHODS FOR PROVIDING BOOKMARKING DATA

(71) Applicant: DISH Network L.L.C., Englewood, CO (US)

(72) Inventors: Robert Lee Sadler, Denver, CO (US); Nereus Osric Edwin Lobo, Lone Tree, CO (US); Yash Sureh Shah, San Mateo, CA (US); Yohann Andre Francois Georges, San Francisco, CA (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/869,535

(22) Filed: Jul. 20, 2022

(65) Prior Publication Data
US 2022/0353582 A1 Nov. 3, 2022

Related U.S. Application Data

(63) Continuation of application No. 17/328,368, filed on May 24, 2021, now Pat. No. 11,418,844, which is a
(Continued)

(51) Int. Cl.
*H04N 21/472* (2011.01)
*H04N 21/845* (2011.01)
(Continued)

(52) U.S. Cl.
CPC ... *H04N 21/47217* (2013.01); *H04N 21/4312* (2013.01); *H04N 21/454* (2013.01);
(Continued)

(58) Field of Classification Search
CPC ......... H04N 21/47217; H04N 21/4312; H04N 21/454; H04N 21/47202; H04N 21/4825;
(Continued)

(56) References Cited

U.S. PATENT DOCUMENTS

| 4,750,213 A | 6/1988 | Novak |
| 5,333,091 A | 5/1996 | Iggulden et al. |

(Continued)

FOREIGN PATENT DOCUMENTS

| CA | 2944641 A1 | 4/2017 |
| EP | 1536362 A1 | 6/2005 |

(Continued)

OTHER PUBLICATIONS

PCT, "European Patent Office International Search Report for PCT/EP2011/051335", dated Sep. 1, 2011.
(Continued)

*Primary Examiner* — Anthony Bantamoi
(74) *Attorney, Agent, or Firm* — Wash Park IP Ltd.; John T. Kennedy

(57) ABSTRACT

A client device is configured to receive bookmarking data from a data processing and aggregating server, the bookmarking data referencing a specific point in a media content item playable from the client device. The client the bookmarking data and outputs a first signal which instructs a display device to display at least one bookmark that includes at least a user-selectable portion and a descriptive portion. Upon receiving an input signal at the client device from a user input device, the input signal indicating a user selection of a bookmark displayed by the display device, the client device outputs a second signal to the display device which instructs the display device to display a media content item from a specific point specified by the bookmarking data.

20 Claims, 25 Drawing Sheets

Related U.S. Application Data continuation of application No. 14/875,558, filed on Oct. 5, 2015, now Pat. No. 11,051,075.

(60) Provisional application No. 62/059,734, filed on Oct. 3, 2014.

(51) Int. Cl.
  *H04N 21/482* (2011.01)
  *H04N 21/431* (2011.01)
  *H04N 21/454* (2011.01)
  *H04N 21/81* (2011.01)
  *H04N 21/239* (2011.01)

(52) U.S. Cl.
  CPC ... *H04N 21/47202* (2013.01); *H04N 21/4825* (2013.01); *H04N 21/812* (2013.01); *H04N 21/8455* (2013.01); *H04N 21/2393* (2013.01)

(58) Field of Classification Search
  CPC .............. H04N 21/812; H04N 21/8455; H04N 21/2393
  See application file for complete search history.

(56) References Cited

U.S. PATENT DOCUMENTS

| | | |
|---|---|---|
| 5,614,940 A | 3/1997 | Cobbley et al. |
| 5,659,539 A | 8/1997 | Porter et al. |
| 5,692,093 A | 11/1997 | Iggulden et al. |
| 5,696,866 A | 12/1997 | Iggulden et al. |
| 5,703,655 A | 12/1997 | Corey et al. |
| 5,742,730 A | 4/1998 | Couts et al. |
| 5,987,210 A | 11/1999 | Iggulden et al. |
| 5,999,688 A | 12/1999 | Iggulden et al. |
| 6,005,603 A | 12/1999 | Flavin |
| 6,057,893 A | 5/2000 | Kojima et al. |
| 6,243,676 B1 | 6/2001 | Witteman |
| 6,425,127 B1 | 7/2002 | Bates et al. |
| 6,850,691 B1 | 2/2005 | Stam et al. |
| 7,032,177 B2 | 4/2006 | Novak et al. |
| 7,110,658 B1 | 9/2006 | Iggulden et al. |
| 7,197,758 B1 | 3/2007 | Blackketter et al. |
| 7,251,413 B2 | 7/2007 | Dow et al. |
| 7,320,137 B1 | 1/2008 | Novak et al. |
| 7,631,331 B2 | 12/2009 | Sie et al. |
| 7,634,785 B2 | 12/2009 | Smith |
| 7,889,964 B1 | 2/2011 | Barton et al. |
| 8,136,140 B2 | 3/2012 | Hodge |
| 8,156,520 B2 | 4/2012 | Casagrande et al. |
| 8,165,451 B2 | 4/2012 | Casagrande |
| 8,606,085 B2 | 12/2013 | Gratton |
| 2002/0069218 A1 | 6/2002 | Sull et al. |
| 2002/0090198 A1 | 7/2002 | Rosenberg et al. |
| 2002/0097235 A1 | 7/2002 | Rosenberg et al. |
| 2002/0124249 A1 | 9/2002 | Shintani et al. |
| 2002/0131511 A1 | 9/2002 | Zenoni |
| 2003/0004933 A1 | 1/2003 | Ben-Yehezkel |
| 2003/0066078 A1 | 4/2003 | Bjorgan et al. |
| 2003/0093790 A1 | 5/2003 | Logan et al. |
| 2003/0126599 A1* | 7/2003 | Novak ............... H04N 7/025 |
| 2003/0154128 A1 | 8/2003 | Liga et al. |
| 2003/0192060 A1 | 10/2003 | Levy |
| 2003/0194213 A1 | 10/2003 | Schultz et al. |
| 2003/0202773 A1 | 10/2003 | Dow et al. |
| 2003/0231854 A1 | 12/2003 | Derrenberger |
| 2004/0010807 A1 | 1/2004 | Urdang et al. |
| 2004/0083484 A1 | 4/2004 | Ryal |
| 2004/0128317 A1 | 7/2004 | Sull et al. |
| 2004/0172650 A1 | 9/2004 | Hawkins et al. |
| 2004/0177317 A1 | 9/2004 | Bradstreet |
| 2004/0190853 A1 | 9/2004 | Dow et al. |
| 2004/0221311 A1 | 11/2004 | Dow et al. |
| 2005/0020223 A1 | 1/2005 | Ellis et al. |
| 2005/0076359 A1 | 4/2005 | Pierson et al. |
| 2005/0081252 A1 | 4/2005 | Chefalas et al. |
| 2005/0097135 A1 | 5/2005 | Epperson et al. |
| 2005/0166258 A1 | 7/2005 | Vasilevsky et al. |
| 2005/0262539 A1 | 11/2005 | Barton et al. |
| 2006/0013555 A1 | 1/2006 | Poslinski |
| 2006/0080716 A1 | 4/2006 | Nishikawa et al. |
| 2006/0218617 A1 | 9/2006 | Bradstreet et al. |
| 2007/0030386 A1 | 2/2007 | Cha et al. |
| 2007/0050837 A1 | 3/2007 | Lopez-Estrada |
| 2007/0098350 A1 | 5/2007 | Gibbon et al. |
| 2007/0136742 A1 | 6/2007 | Sparrell |
| 2007/0168543 A1 | 7/2007 | Krikorian et al. |
| 2007/0171303 A1 | 7/2007 | Barbieri et al. |
| 2007/0189719 A1* | 8/2007 | Furumachi ............... H04N 7/00 |
| 2007/0212030 A1 | 9/2007 | Koga et al. |
| 2007/0244903 A1 | 10/2007 | Ratliff et al. |
| 2007/0300249 A1 | 12/2007 | Smith et al. |
| 2007/0300250 A1 | 12/2007 | Smith et al. |
| 2008/0052739 A1 | 2/2008 | Logan |
| 2008/0112690 A1 | 5/2008 | Shahraray et al. |
| 2008/0177858 A1 | 7/2008 | Aarnio et al. |
| 2008/0183587 A1 | 7/2008 | Joo et al. |
| 2008/0267584 A1 | 10/2008 | Green |
| 2008/0320523 A1 | 12/2008 | Morris et al. |
| 2009/0129747 A1 | 5/2009 | Casagrande |
| 2009/0133093 A1 | 5/2009 | Hodge |
| 2009/0238536 A1 | 9/2009 | Gratton |
| 2009/0254823 A1 | 10/2009 | Barrett |
| 2009/0300699 A1 | 12/2009 | Casagrande et al. |
| 2009/0304358 A1 | 12/2009 | Rashkovskiy et al. |
| 2009/0307741 A1 | 12/2009 | Casagrande |
| 2010/0046919 A1 | 2/2010 | Song |
| 2010/0053452 A1 | 3/2010 | Abe et al. |
| 2010/0088726 A1* | 4/2010 | Curtis ................ H04N 5/445 |
| 2010/0138761 A1 | 6/2010 | Barnes |
| 2011/0047571 A1 | 2/2011 | Zhang et al. |
| 2011/0075990 A1 | 3/2011 | Eyer |
| 2011/0194838 A1 | 8/2011 | Meijer |
| 2011/0197224 A1 | 8/2011 | Meijer |
| 2012/0070129 A1 | 3/2012 | Lin et al. |
| 2012/0072944 A1* | 3/2012 | Felt ................. H04N 7/18 |
| 2013/0247098 A1* | 9/2013 | Ohya ............... H04N 21/435 |
| 2015/0181301 A1* | 1/2015 | Bloch ............. H04N 21/47217 |
| 2015/0181300 A1* | 6/2015 | Rajan ............. H04N 21/47214 |
| 2015/0237389 A1 | 8/2015 | Grouf et al. |

FOREIGN PATENT DOCUMENTS

| | | |
|---|---|---|
| EP | 1705908 A2 | 9/2006 |
| JP | 2001359079 A | 12/2001 |
| JP | 2006262057 A | 9/2006 |
| WO | 2001022729 A1 | 3/2001 |
| WO | 2005096625 A1 | 10/2005 |
| WO | 2006003585 A1 | 1/2006 |

OTHER PUBLICATIONS

Canadian Patent Application Serial No. 2944641, Non-final Office Action, dated Dec. 2, 2022, received by applicant/undersigned on Dec. 15, 2022.

Canadian Patent Application Serial No. 2944641, Response to Non-final Office Action, dated Mar. 15, 2023.

Canadian Patent Application Serial No. 2944641, Office Action, dated Sep. 12, 2023.

* cited by examiner

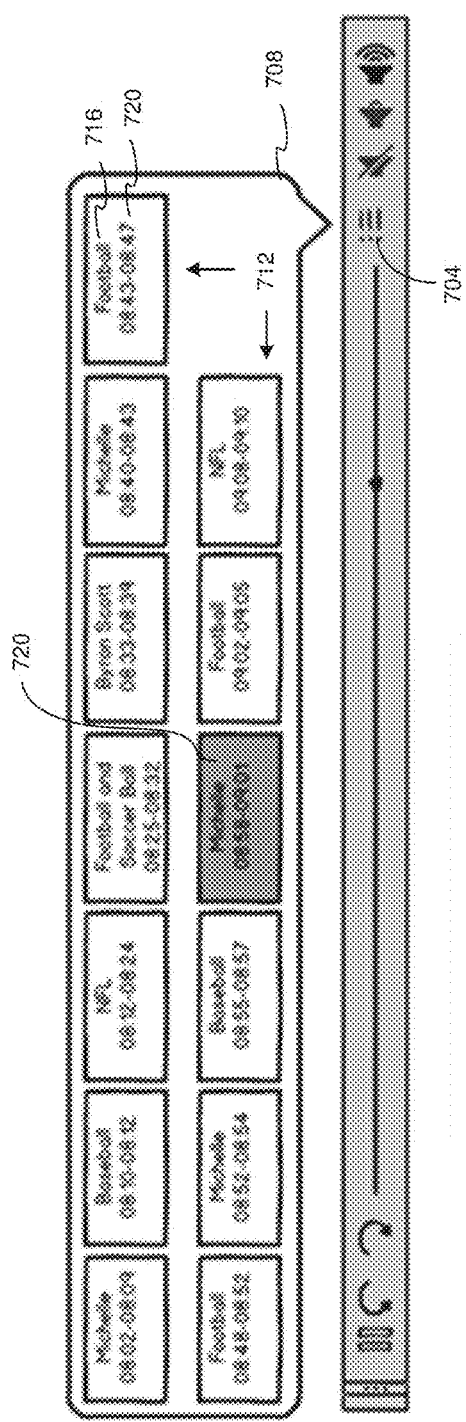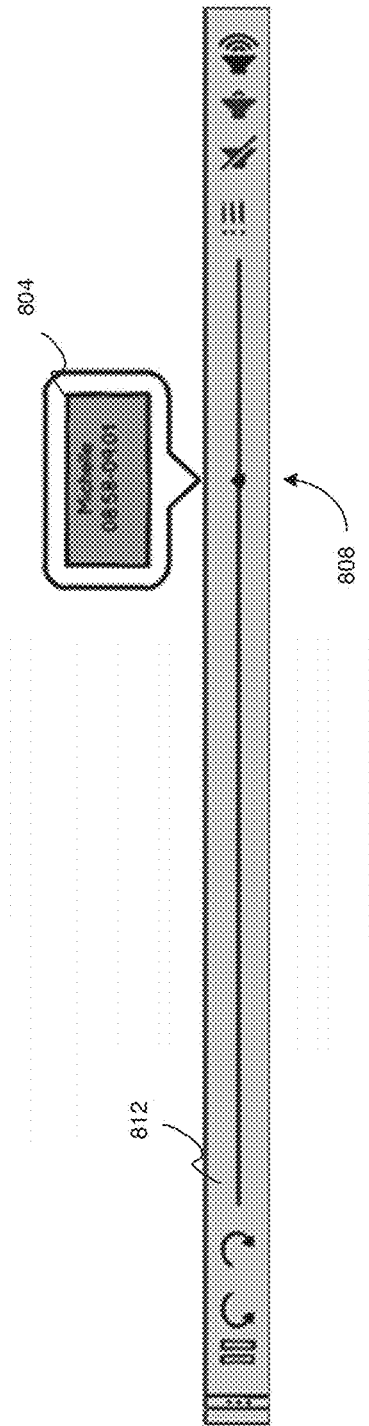
Fig. 7
Fig. 8

SYSTEM AND METHODS FOR PROVIDING BOOKMARKING DATA

CROSS REFERENCE TO RELATED APPLICATIONS

This application is a Continuation of co-pending U.S. application Ser. No. 17/328,368, filed on 24 May 2021 (the "'368 application), which is a Continuation application of U.S. application Ser. No. 14/875,558, filed on 5 Oct. 2015 (the "'558 application"), which issued as U.S. Pat. No. 11,051,075 on 29 Jun. 2021, with both the '368 application and the '558 application being entitled "Systems and Methods for Providing Bookmarking Data"; and also which claims priority to U.S. Provisional Application Ser. No. 62/059,734 filed on 3 Oct. 2014 and entitled "Bookmarking Data" (the "'734 application"). The present application and each of the '368 application, the '558 application, and the '734 application are/were filed in the name of inventors Robert Lee Sadler, et al. Priority to each of the above identified applications is herewith claimed and the disclosure of each such application are hereby incorporated by reference in their entirety.

TECHNICAL FIELD

The technology described herein relates to systems and methods for providing bookmarking data in set-top boxes or other types of client devices.

BACKGROUND

Set-top boxes or other types of client devices may be generally configured to store or access media content such as recorded video content or buffered content. It is desirable for there to be a mechanism for accessing the media content at specific points within the recorded video content. Furthermore, it is desirable for there to be a mechanism for selecting media content at specific points in a manner that is convenient for the user and in a manner that conveys information about the media content to be selected. Presently available systems do not provide such functionality. Instead, content can only be accessed at the beginning thereof or at a point of time identified by a user using a fast-forward/fixed increment jump/rewind functionality, random access or otherwise.

The information included in this Background section of the specification, including any references cited herein and any description or discussion thereof, is included for technical reference purposes only and is not to be regarded as subject matter by which the scope of the invention as defined in the claims is to be bound.

SUMMARY

In one respect, the various embodiments of the present disclosure are directed to systems and methods for presenting media content, including receiving bookmarking data at a client device from a data processing and aggregating server, the bookmarking data referencing a specific point in a media content item that is playable directly or indirectly from the client device; providing a first output signal based on the bookmarking data from the client device to a display device, the output signal causing the display device to display at least one bookmark that includes at least a user-selectable portion and a descriptive portion; receiving an input signal at the client device from a user input device, the input signal indicating a user selection of a bookmark displayed by the display device; and providing a second output signal from the client device to the display device responsive to the input signal, the second output signal causing the display device to display a media content item at a specific point specified by the bookmarking data.

In some implementations, the first output signal causes the display device to display a list of selectable bookmarks. Such list may include a title and length for each of the one or more bookmarks.

In some implementations, a second output signal may be generated which instructs and/or causes the display device to additionally display the selected bookmark over a current playback position in a progress bar including the title and length for the selected bookmark.

In some implementations, the first output signal instructs and/or causes the display device to display a list of bookmarks with titles and start and stop times for each of the bookmarks.

In some implementations, the second output signal instructs and/or causes the display device to additionally display the selected bookmark over a current playback position in a progress bar including the title and start and stop times for the selected bookmark.

In some implementations, the first output signal instructs and/or causes the display device to display a list of bookmarks with titles and at least one category indicator for each of the bookmarks.

In some implementations, the second output signal causes the display device to additionally display the selected bookmark over a current playback position in a progress bar including the title and category for the selected bookmark.

In some implementations, the first output signal instructs and/or causes the display device to display a popup overlay on a gird of digital video recorder ("DVR") items, the popup overlay may include a button that when selected instructs and/or causes the display device to generate and display a second overlay, the second overlay having one or more selectable bookmarks.

In some implementations, the selectable bookmarks of the second overlay are arranged in a single column.

In some implementations, the selectable bookmarks of the second overlay are arranged in two adjacent columns.

In some implementations, the first output signal instructs and/or causes the display device to display a menu of bookmarks alongside a video output of the corresponding media content, each bookmark in the menu including a list of descriptors for the bookmark.

In some implementations, the second output signal instructs and/or causes the display device to additionally display the selected bookmark over a current playback position in a progress bar including the list of descriptors for the bookmark.

In some implementations, the media content item is a commercial and the second output signal causes the media content item to skip to the beginning of the commercial.

In some implementations, the media content item is a commercial and the second output signal causes the media content item to skip to the end of the commercial.

In some implementations, the second output signal is provided responsive to user input.

In some implementations, the second output signal is automatically provided responsive to a commercial skipping setting.

In some implementations, the bookmarking data specifies a location of age restricted content within the media content item.

In another respect, at least one implementation of the present disclosure is directed to a method of processing a request for bookmarking data, including receiving a request for bookmark data from client device; requesting information from one or more data sources to fulfill the request for bookmark data; receiving one or more replies from those data sources responding to the request for information; processing the one or more responses received from the one or more sources to generate the bookmark data; and transmitting the bookmark data to the client device responsive to the request.

Some implementations further include determining if the data, all or in part, needed for fulfilling the request has been received from the data sources; and repeating the operations of determining and requesting information until the information needed for generating the requested bookmark has been received.

Some implementations further include, prior to the operation of requesting information from one or more data sources, determining what information is needed to fulfill the request for bookmark data.

This Summary is provided to introduce a selection of concepts in a simplified form that are further described below in the Detailed Description. This Summary is not intended to identify key features or essential features of the claimed subject matter or to be used to limit the scope of the claimed subject matter. A more extensive presentation of features, details, utilities, and advantages of the various embodiments described herein and of the present invention, as defined in the claims presently or hereafter pending, is provided in the following written description of various embodiments of this disclosure and illustrated in the accompanying drawings.

BRIEF DESCRIPTION OF THE DRAWINGS

FIG. 7 depicts a portion of a display device screen shot that includes one or more bookmarks that display start and stop times for a selected media content in accordance with at least one of the present embodiments.

FIG. 8 depicts a portion of a display device screen shot that includes a bookmark displayed over a current playback position for a selected media content in accordance with at least one of the present embodiments.

DETAILED DESCRIPTION

Figure 1:
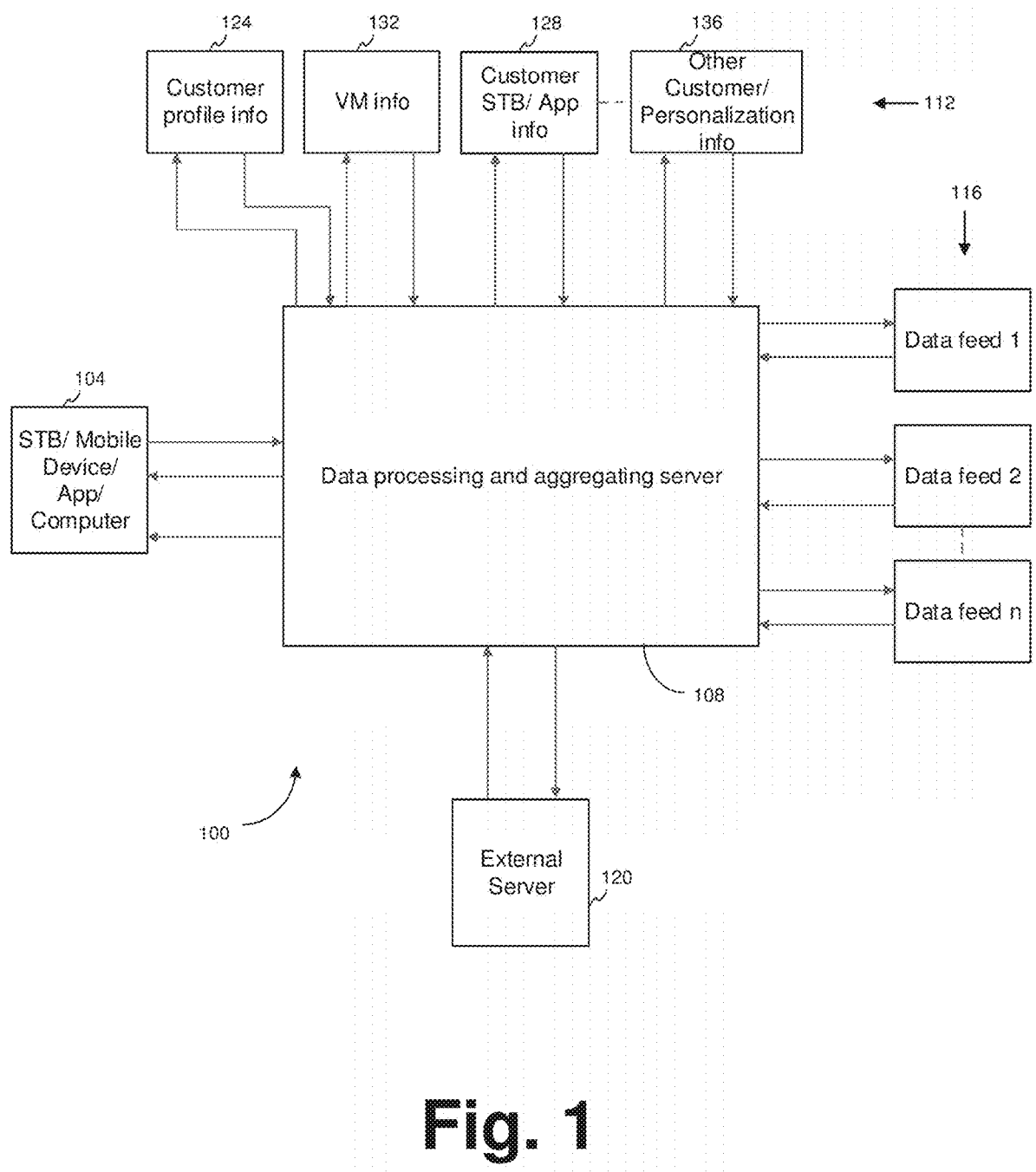
FIG. 1 is a schematic of a communication and computer networking environment that includes one or more components and features of one or more of the present embodiments.

As depicted in FIG. 1, at least one embodiment of a communication and networking environment 100 includes a client device 104 that, as described in greater detail below, is generally configured to receive media content from a content source, such as a satellite television provider, cable television provider, streaming media source, or the like. The client device 104 is provided in association with a data processing and aggregating server 108 that is generally configured to provide bookmarking data to the client device 104 responsive to requests for the data. In responding to requests for bookmarking data, the data processing and aggregating server 108 may communicate with various information sources 112 and/or data feeds 116 and, in so doing, compile information that makes-up the bookmark or that is used to create the bookmark. In one implementation, requests for bookmarking data are generated in the client device 104 and transmitted to the server 108. In some implementations, requests for bookmarking data are generated in other devices that communicate with the server 108. For example, a request for bookmarking data may be generated in a data feed 116 or in an external server 120. In still other embodiments, requests for bookmarking data may be generated in the server 108 itself.

As used herein, "bookmarking data" means data that specifies a location of a particular point or content segment within a given media program that may be received, played and/or otherwise presented at the client device 104 or via the client device 104, for example, via a directly or indirectly connected presentation device. For example, the media program may be a movie that is scheduled to be shown at a particular time by a particular content provider. In this example, the bookmarking data may include specific times for particular points in the movie, such as, the start of the movie, a particular scene in the movie, commercial breaks that will occur during the movie, the end of the movie, and so on. The client device 104 may be configured to use the bookmarking data to take certain actions, such as recording the entire media program, recording parts of the media program, deleting certain content segments from a recorded program, skipping certain content segments during playback of a media program, and so on. These types of bookmarking data and use of bookmarking data are provided by way of example and not by means of limitation. Additional examples of bookmarking data and uses of bookmarking data in accordance with this disclosure are discussed in greater detail below.

The client device 104 is generally configured to receive media content from a content source. In some embodiments, the client device 104 may be implemented as a set-top box (STB) or other device that is specifically configured to receive content from a service provider. The STB may be limited to receiving content from only specified service providers or, as the case may be, from any number of service providers. For example, in other embodiments, client device 104 may be a more general-purpose computing device such as a desktop computer, laptop computer, tablet computer or mobile device. As depicted in FIG. 1, the client device 104 may include an application program or other executable code that when executed on the client device 104 enables the client device 104 to receive and play media content. Such application program may be resident to the client device, hosted on a server or otherwise executed, as desired for any particular implementation of one or more of the present embodiments. The client device 104 may be configured to receive and utilize bookmarking data that provides information about certain media content. In other examples, the client device 104 may request and receive bookmark data in the form of a modified list of viewer measurement data or in the form of timer data for a recording device, such as a digital video recorder.

Data processing and aggregating server 108 is generally configured as a computing device that receives information regarding one or more media content from one or more data sources and generates bookmarks for the client device 104. In at least one implementation, the server 108 generates a modified list of viewer measurement (VM) based data for the client device 104. In at least one implementation, server 108 generates timers for the client device 104. The server 108 may be implemented on one or more virtual and/or physical servers that are configured for processing and aggregating data for use in providing bookmarks. In other implementations, the server 108 may be implemented as a cloud-based device or other similar arrangement. The server 108 may also exist as a processing unit on the client device 104 or within an application running thereon.

The data processing and aggregating server 108 may be provided in association with and/or in communication with one or more information sources 112 that the server 108 may query, in advance or at the time of a request for information in connection with a request for bookmarking data. For instance, the server 108 may be provided in association with, communicatively coupled to or otherwise capable of accessing a user profile information source 124. The server 108 may connect to the user profile information source 124 and receive demographic, psychographic, preferences and/or other information about the user such as name, likes, dislikes, favorites, favorite teams, favorite events, favorite actors, programming packages, Pay-Per-View (PPV) events, Video-On-Demand (VOD), etc. The server 108 may also connect to a user STB information source 128 and receive information about the user's STB or other client device 104. Such information may include system time, device diagnostics, software version, serial numbers, firmware information, etc. The server 108 may also be provided in association with viewer measurement information source 132 that provides statistics or similar data on the viewing habits of one or more users. Generally, the server 108 may connect to any appropriate information source that provides relevant information, including a miscellaneous database 136 that may be used to provide personalized information about the user and/or the user's device.

The data processing and aggregating server 108 may also be provided in association with one or more data feeds 116 from which the server 108 receives information usable for responding to a request for bookmarking or other data. In some cases, the server 108 may receive a request for bookmarking data from one or more of the data feeds 116. The server 108 may receive information from various data feeds for generating bookmarks. Examples of data feeds include (but are not limited to): identifying commercials, identifying topics in recorded or streamed content, categories of bookmarks, start and stop time of bookmarks, category of bookmarks, timing info, trending events and keywords, video clips, alternate audio/video feed etc. The server 108 may receive information from various data feeds for generating commercial identification related bookmarks. Examples of data feeds include (but are not limited to): identifying commercials, categories of commercials, start and stop times of commercials, timing info, trending events and keywords, video clips, alternate audio/video feeds etc. The server 108 may receive information from various data feeds for modifying the VM based list. Examples of data feeds include (but are not limited to): identifying commercials, identifying topics in a recorded or streamed content, trending events and keywords, category of bookmarks, timing info, video clips, alternate audio/video feed etc. The server 108 may receive information from various data feeds for generating timers. Examples of data feeds include (but are not limited to): cast information, identifying topics in a recorded or streamed content, identifying sporting events, sporting event info, timing info, trending events and keywords, video clips, alternate audio/video feed etc.

In at least one implementation, the data processing and aggregating server 108 may be provided in association with an external server 120. The external server 120 may be configured to generate request for bookmarking data that is then processed by the data processing and aggregating server 108 and sent to the client device 104, as appropriate. Here, the external server 120 may generate the request on behalf of the client device 104 or an application running thereon.

Client Device

In at least one implementation, a client device may take the form of a television receiver. As described for purposes of illustration only and not by means of limitation, a television receiver will be described herein as a set-top box, such as a satellite television, cable television, terrestrial television, streaming media receiver or internet television receiver that is external to an associated presentation device. However, it is to be appreciated that the television receiver may also be integrated within a presentation device, such as a television with an integrated cable television receiver.

Figure 2:
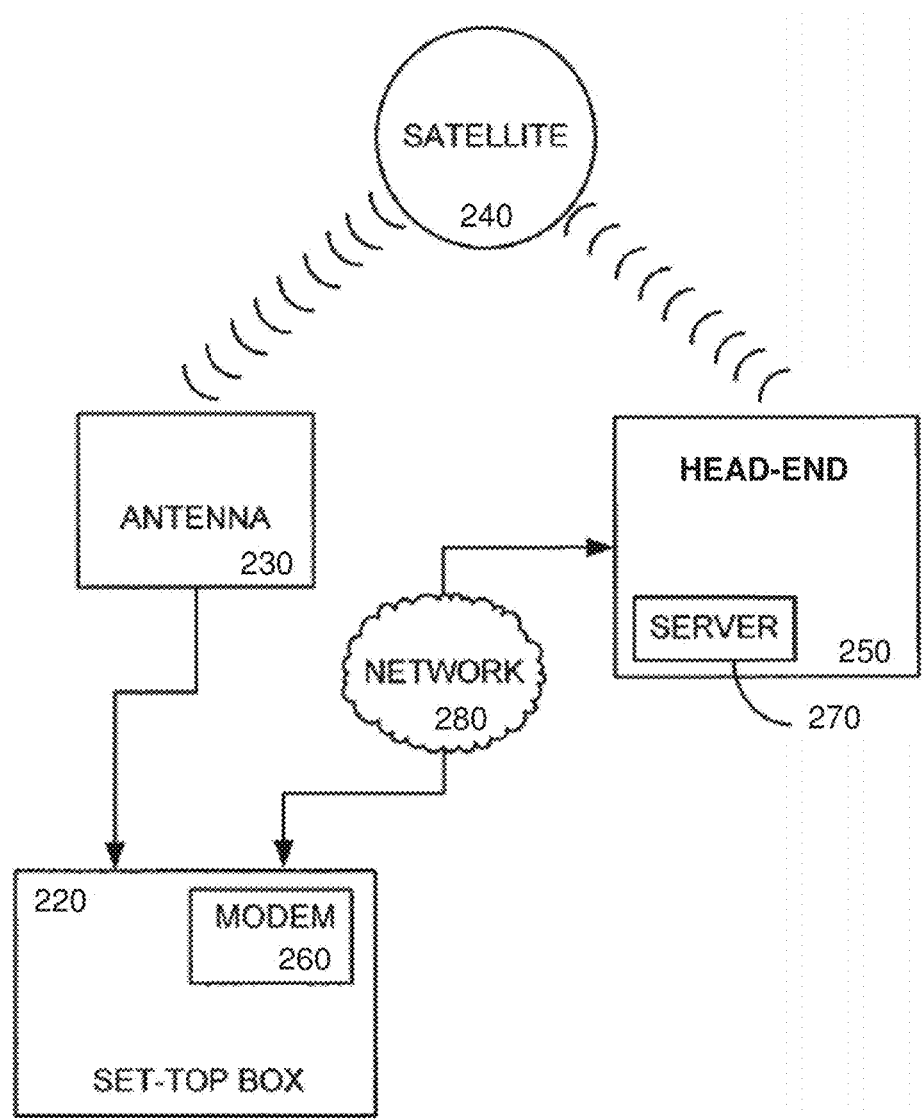
FIG. 2 depicts a satellite television system that may request and/or receive bookmarking data in accordance with a least one of the present embodiments.

As shown in FIG. 2, one embodiment of the present disclosure for providing bookmarking data may be implemented using a direct broadcast satellite system and or wired or wireless broadband, cable or similar type systems.

The television system of FIG. 2 may include a set-top box (STB) 220 configured to provide a user with content and with an interface to the television system. The STB 220 of the system may receive an encrypted television signal and convert it into a signal that a user's television may recognize in order to display it to the user. Further, the STB 220 may provide the converted signal to a display device, such as a television or computer screen, for presentation to the user via a display device. In one implementation, the STB 220 may receive the encrypted signal from a satellite 240 or through a digital cable or network connection. Further, in the satellite and digital cable configurations, the encrypted television signal may be generated by a head-end 250 and transmitted to the STB 220. Generally, the head-end 250 may be a master facility that receives television signals for processing and distribution to various television systems. In a satellite television provider, the head-end 250 may transmit the audio/visual signal to a satellite 240 for redistribution to subscribers. Upon receipt, the satellite 240 may transmit the signal to an antenna 230 connected to the STB 220 for decryption. It is to be appreciated that the antenna 230 may take any of varying forms, including but not limited to, flat panel, parabolic, phased array, wand or otherwise.

In a cable television system configuration, the head-end 250 may transmit the television signal directly or indirectly to the STB 220 over one or more cable network connections. For example, the signal may be provided to the STB 220 through a dedicated cable connected between the STB 220 and the head-end 250. Alternatively, the signal may be provided over a network 280 connection, utilizing a modem 260 associated with the STB 220. Additionally, the head-end 250 may utilize the network 280 to provide other communication signals to the STB 220. For example, the head-end 250 may utilize a server 270 in communication with the head-end and the network 280 provide programming updates to the STB 220 over the network connection. Further, the STB 220 may also communicate over the network 280 connection to provide information to the head-end 250 or to store information within the network 280 itself.

Figure 3:
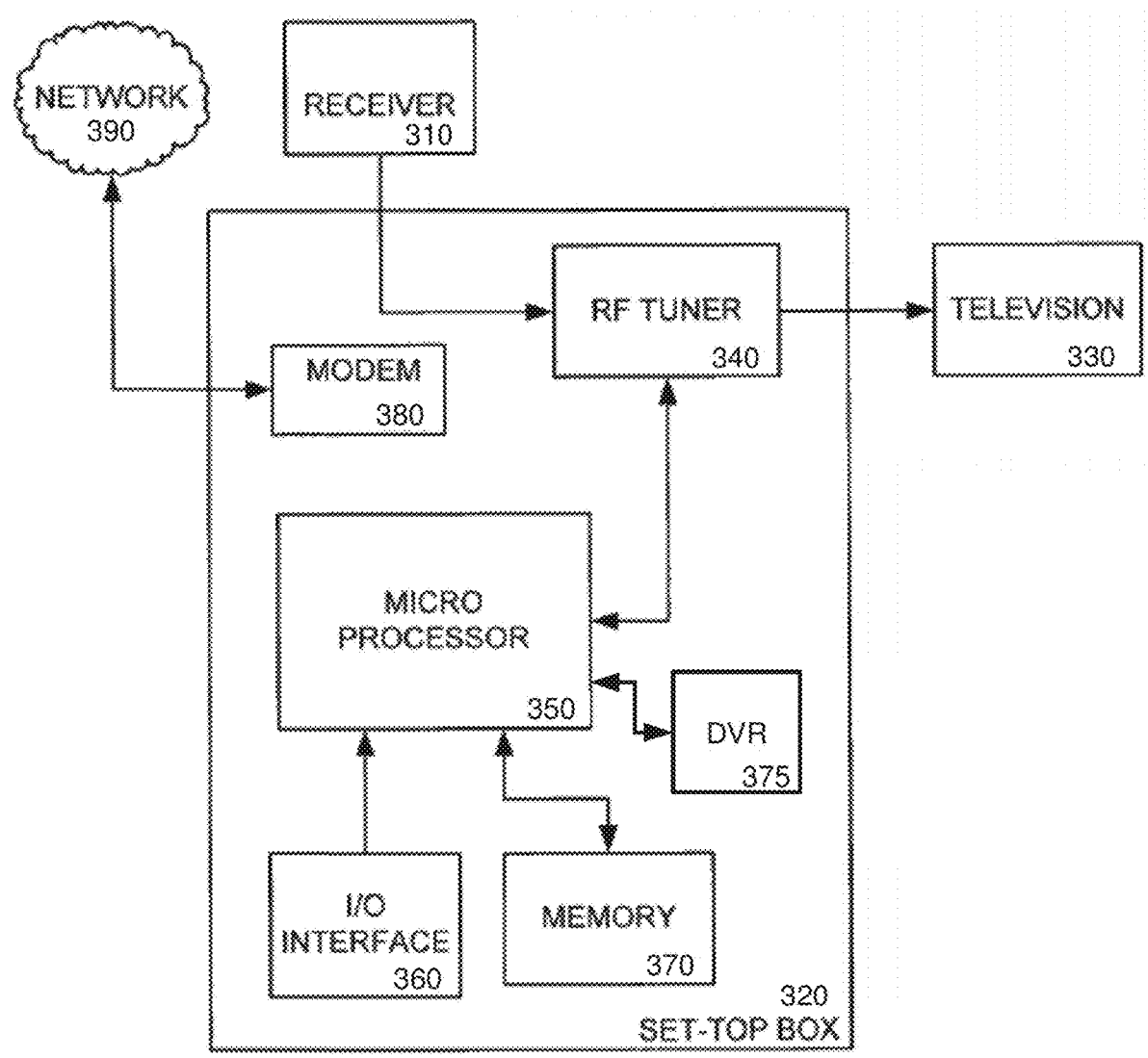
FIG. 3 illustrates a block diagram of an STB which may be used in implementing embodiments described herein in accordance with at least one of the present embodiments.

As shown in FIG. 3, an STB 320 may receive a transmitted television signal from a satellite receiver 310, a network source 390 or a combination of the two. The STB 320 may transmit a translated signal to a user's television 330 for presentation to the user via a display device. The television signal may be received at the STB 320 by a radio frequency (RF) tuner 340. The RF tuner 340 may translate the received signal and provide that signal, directly or indirectly, to the user's television 330 or other display device. Although not shown, the satellite receiver 310 may include a low noise block (LNB) or other components to decrypt and transmit the received television signal. Similarly, the STB 320 may include more or fewer components as those shown.

Further, as described above, the STB 320 may provide an interface to the user through the user's television 330 or other display device. In providing the interface to the user, the STB 320 may include a microprocessor 350 coupled to memory 370, as described in more detail below. The set-top box may also include an input/output (I/O) interface 360 to interface one or more I/O bridges or I/O devices. I/O devices may also include an input device (not shown), such as an infra-red or radio frequency signal provided by remote control device or alphanumeric input device, including alphanumeric and other keys for communicating information and/or command selections to the microprocessor 350. The I/O device may be utilized by a user to provide inputs and commands to the STB 320 to control the interface. Inputs may also be received from a network 390 through a modem 380 coupled to the STB 320. The modem 380 may be connected to the STB 320 through the I/O interface 360 or may be integrated within the STB 320. The modem 380 may also be configured to communicate over the network 390 to provide and receive information and commands from the network.

The STB 320 may include or be associated with a recorder 375, such as a digital video recorder (DVR). As used herein, a DVR or recorder 375 may be any physical or virtual device configured to record media content, such as a physical DVR, a cloud DVR, or a recorder for other content such as from streaming sources or for the playback of video-on-demand (VOD) content. Some devices, e.g. the ones that play VOD content or streaming content, may not explicitly record content, but rather may receive a file or a link to a file that is sent from a service provider. In various embodiments, the service provider may send the file or the link to the file to the VOD device, a STB, a mobile device, or the like. The recorder 375 may be integrated into the STB 320, provided via one or more networked devices, including but not limited to servers, may be a standalone device or otherwise provided. The recorder 375 may be configured automatically, manually, for example directly by a user, or otherwise to record a particular program at a specified time. When the program occurs, the recorder 375 will record and store the program, which can then be viewed later. In addition to this functionality, the recorder 375 may buffer a certain amount of content during a live transmission. Buffering a live transmission allows a user to pause and/or rewind the content of the transmission and then display the content in a non-live or delayed manner. When the recorder 375 is configured to record a particular program, such recording may be listed on one or more recording lists. Such recording lists may be generated automatically or based on user input.

STB 320 may also include a dynamic storage device, referred to as memory 370, or a random access memory (RAM) or other devices coupled to the STB for storing information and instructions to be executed by the microprocessor 350. Memory 370 also may be used for storing temporary variables or other intermediate information during execution of instructions by the microprocessor 350. According to at least one embodiment, the implementations described below may be performed by a STB 320 in response to microprocessor 350 executing one or more sequences of one or more instructions contained in memory 370. These instructions may be read into memory 370 from another machine-readable medium, such as a storage device. Execution of the sequences of instructions contained in memory 370 may cause the microprocessor 350 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 370. Common forms of machine-readable medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Data Processing and Aggregating Server

Figure 4:
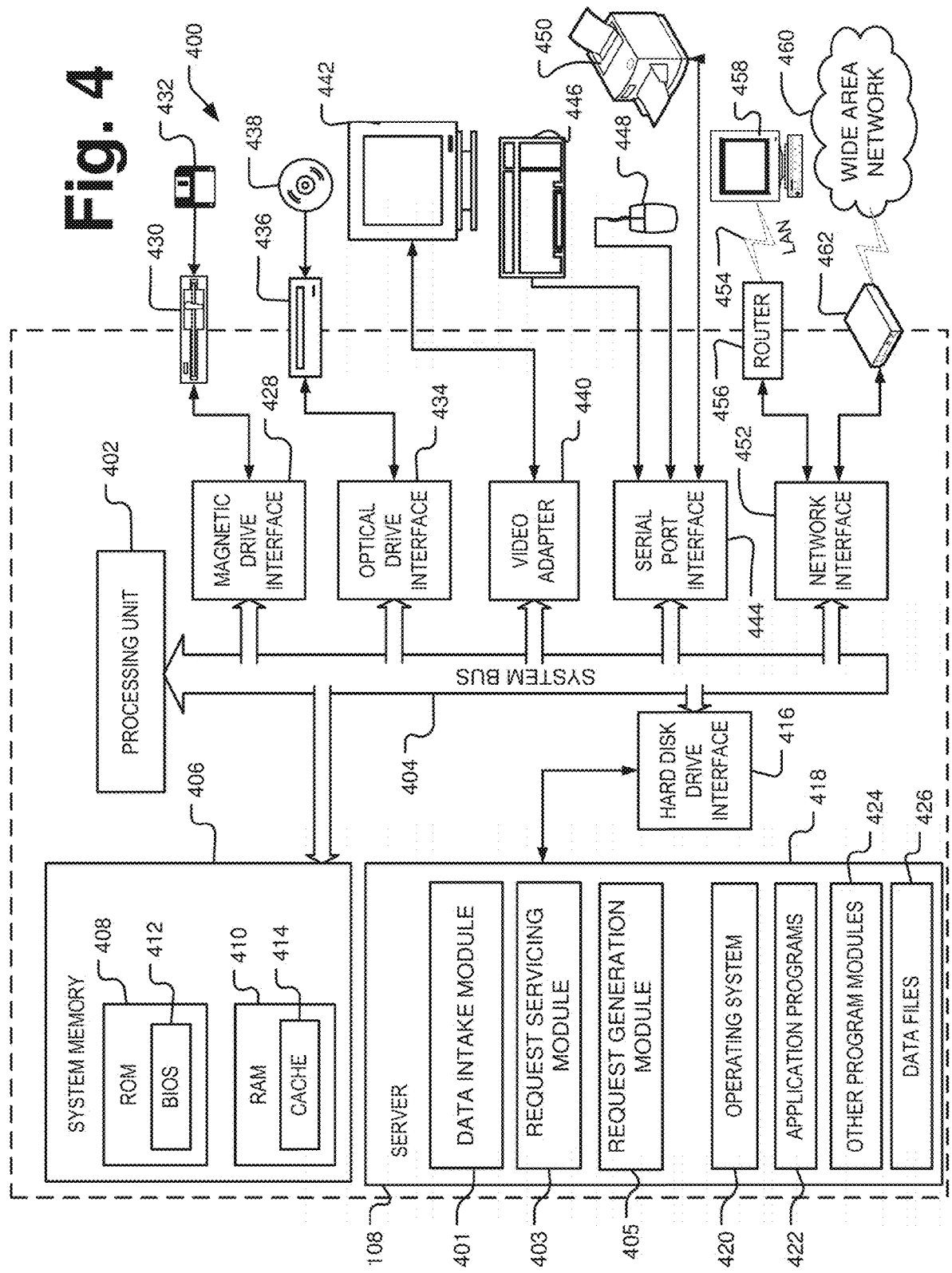
FIG. 4 illustrates a block diagram of a computer system for implementing at least one of the data processing and aggregating server embodiments described herein.

As shown in FIG. 4, for at least one embodiment, a computer system 400 used to implement the data processing and aggregating server 108 functions and capabilities may be one or more computing devices such as a single-server, clustered server, blade server, virtual server operating environment, personal computer (PC), mainframe computer, distributed computer, Internet appliance, or other computer devices, or combinations thereof. Such computing device(s) include those internal processing and memory components as well as interface components utilized for connection with external input, output, storage, network, and other types of peripheral devices. Internal components of the computer system in FIG. 4 are shown within the dashed line and external components are shown outside of the dashed line. Components that may be internal or external are shown straddling the dashed line.

In any embodiment or component of the system described herein, the computer system 400 includes a processor 402 and a system memory 406 connected by a system bus 404 that also operatively couples various system components. There may be one or more processors 402, e.g., a single central processing unit (CPU), or a plurality of processing units, commonly referred to as a parallel processing environment (for example, a dual-core, quad-core, or other multi-core processing device). The system bus 404 may be any of several types of bus structures including a memory bus or memory controller, a peripheral bus, a switched fabric, point to point connection, and a local bus using any of a variety of bus architectures. The system memory 406 may include read only memory (ROM) 408 and random access memory (RAM) 410. A basic input/output system (BIOS) 412 or the like, containing those basic routines that help to transfer information between elements within the computer system 400, such as during start up, may be stored in ROM 408. A cache 414 may be set aside in RAM 410 to provide a high speed memory storage for frequently accessed data.

A hard disk drive interface 416 may be connected with the system bus 404 to provide read and write access to a data storage device, e.g., a hard disk drive 418. It is to be appreciated that such hard disk drive 418 or comparable device may be configured to provide nonvolatile storage for applications, files, content and other data. A number of program modules and other data may be stored on the hard disk 418, including an operating system 420, one or more application programs 422, and data files 424. In an exemplary implementation, the hard disk drive 418 may store code associated with data processing and aggregating server 108 according to at least one of the embodiments described herein. As shown in FIG. 4, the data processing and aggregating server 108 may include one or more modules that facilitate its operation, such as a data intake module 401, a request servicing module 403, and a request generation module 405. Note that the hard disk drive 418 may be either an internal component or an external component of the computer system 400 as indicated by the hard disk drive 418 straddling the dashed line in FIG. 4. In some configurations, there may be both an internal and an external hard disk drive 418.

The computer system 400 may further include a magnetic disk drive 430 for reading from or writing to a removable magnetic disk 432, tape, or other magnetic media. The magnetic disk drive 430 may be connected with the system bus 404 via a magnetic drive interface 428 to provide read and write access to the magnetic disk drive 430 initiated by other components or applications within the computer system 400. The magnetic disk drive 430 and the associated computer readable media may be used to provide nonvolatile storage of computer readable instructions, data structures, program modules, and other data for the computer system 400.

The computer system 400 may additionally include an optical disk drive 436 for reading from or writing to a removable optical disk 438 such as a CD ROM or other optical media. The optical disk drive 436 may be connected with the system bus 404 via an optical drive interface 434 to provide read and write access to the optical disk drive 436 initiated by other components or applications within the computer system 400. The optical disk drive 436 and the associated computer readable optical media may be used to provide nonvolatile storage of computer readable instructions, data structures, program modules, and other data for the computer system 400.

A display device 442, e.g., a monitor, a television, or a projector, or other type of presentation device may also be connected to the system bus 404 via an interface, such as a video adapter 440 or video card. Similarly, audio devices, for example, external speakers or a microphone (not shown), may be directly or indirectly connected to the system bus 404 through an audio card or other audio interface (not shown).

In addition to the monitor 442, the computer system 400 may include other peripheral input and output devices, which are often connected to the processor 402 and memory 406 through the serial port interface 444 that is coupled to the system bus 404. Input and output devices may also or alternately be connected with the system bus 404 by other interfaces, for example, a universal serial bus (USB), an IEEE 1394 interface ("Firewire"), a parallel port, or a game port. A user may enter commands and information into the computer system 400 through various input devices including, for example, a keyboard 446 and pointing device 448, for example, a mouse. Other input devices (not shown) may include, for example and not by means of limitation, a joystick, a game pad, a tablet, a touch screen device, an antenna, a scanner, a facsimile machine, a microphone, a digital camera, and a digital video camera.

Output devices may include a printer 450 and one or more loudspeakers (not shown) for presenting audio. Other output devices (not shown) may include, for example and not by means of limitation, a plotter, a photocopier, a photo printer, a facsimile machine, and a press. In some implementations, several of these input and output devices may be combined into single devices, for example, a printer/scanner/fax/photocopier. It should also be appreciated that other types of computer readable media and associated drives for storing data, for example, magnetic cassettes or flash memory drives, may be accessed by the computer system 400 via the serial port interface 444 (e.g., USB) or similar port interface.

The computer system 400 may operate in a networked environment using logical connections through a network interface 452 coupled with the system bus 404 to communicate with one or more remote devices. The logical connections depicted in FIG. 4 include a local area network (LAN) 454 and a wide area network (WAN) 460. Such networking environments are commonplace in home networks, office networks, enterprise wide computer networks, and intranets. These logical connections may be achieved by a communication device coupled to or integral with the computer system 400. As depicted in FIG. 4, the LAN 454 may use a router 456 or hub, wired or wireless, internal or external, to connect with remote devices, e.g., a remote computer 458, similarly connected on the LAN 454. The remote computer 458 may be another personal computer, a server, a client, a peer-to-peer device, or other common network node, and typically includes many or all of the elements described above relative to the computer system 400.

To connect with a WAN 460, the computer system 400 typically includes a modem 462 for establishing communications over the WAN 460. Typically, the WAN 460 may be the Internet. However, in some instances the WAN 460 may be a large private network spread among multiple locations, or a virtual private network (VPN). The modem 462 may be a telephone modem, a high speed modem (e.g., a digital subscriber line (DSL) modem), a cable modem, or similar type of communications device. The modem 462, which may be internal or external, is connected to the system bus 404 via the network interface 452. In at least one embodiment, the modem 462 may be connected via the serial port interface 444. It should be appreciated that the network connections shown are exemplary and other means of and communications devices for establishing a network communications link between the computer system 400 and other devices or networks may be used.

Segment Bookmarking

FIGS. 5-15 depict screenshots of a user interface presented to a user from a set-top box or other client device 104. User interfaces depicted in FIGS. 5-15 may include an interface or guide for a DVR or other recording device. A user interface may allow the user to interact and configure a television system, including providing the user with options for requesting and using bookmarking data. Such bookmarking data may be presented to the user through an on-screen guide or through any other interface menu that may allow a user to select a desired bookmark. Generally, the user may access and interact with the user interface through a remote control. The remote control may allow the user to navigate through the various menus and options of the user interface to configure the interface as desired by the user. It should be appreciated, however, that the user may interact and provide inputs to the user interface through any I/O device, such as via push-buttons located on the front of the STB, hand gestures, voice commands or otherwise.

One aspect of the user interface provided to the user may be requesting and/or using bookmarks provided by a data processing and aggregating server 108. A data processing and aggregating server 108 in accordance with the present disclosure may use or parse a data feed to bookmark specific segments in a show, movie or sporting event (collectively "event") to thereby allow a user to skip to a specific moment of the event using those bookmarks. By way of example and not limitation, bookmarks may be in displayed in connection with one or more "reality TV" shows or game shows. Bookmarks in this case may correspond to relevant moments in the show such as the introduction, different contestant performances, judges' feedback, guest performances, results, or the like. Bookmarks may be displayed in connection with talk shows. Bookmarks in this case may correspond to the intro/monologue, segments before guests, segments where the guests appear, content guests chat about, musical performances, or the like. Bookmarks may be displayed in connection with news and/or sports news shows. Bookmarks in this case may correspond to segments in the program. Bookmarks may be displayed in connection with sporting events, such as football, baseball, soccer, tennis, hockey, etc. Bookmarks in this case may correspond to sports based data like periods of the game, scoring plays or exciting moments such as outs in baseball games, blocks, tackles, scoring attempts, moments of controversy, or the like.

Bookmarks in accordance with the at least one embodiment of the present disclosure many include one or more particular features that provide advantage to users. With respect to the placement on the display area, bookmarks may be presented to the user in a variety of locations. For example and not by limitation, bookmarks may be displayed in the info page/section of the event, in a popup after a user selects play/resume/start over, in a progress bar for the show/event, above the current moment of playback in the progress bar, and/or as a notification. Bookmarks may be actionable. More specifically, when a user taps/clicks on a topic, the device may skip to within a few seconds of the start bookmarked time. By way of example and not limitation, a data feed for a bookmark may contain descriptive information such as bookmark title, bookmark description, bookmark start time, bookmark end time, bookmark category (Sports: score updates, time periods, game highlights, or the like; talk show/news: themes, breaking news, reality shows, performance, results, judge's feedback, guest performer, or the like), and bookmark length. Bookmarks may be colored based on the category (scoring vs. end/beginning of time period, performance, judging, results, breaking news, or the like). Additionally, in the case that the bookmarks are displayed over a progress bar where the scrubbing of playback to a particular point is allowed, the cursor/playback head may gravitate to the start of a topic as it gets close to the start time of the bookmark.

Figure 5:
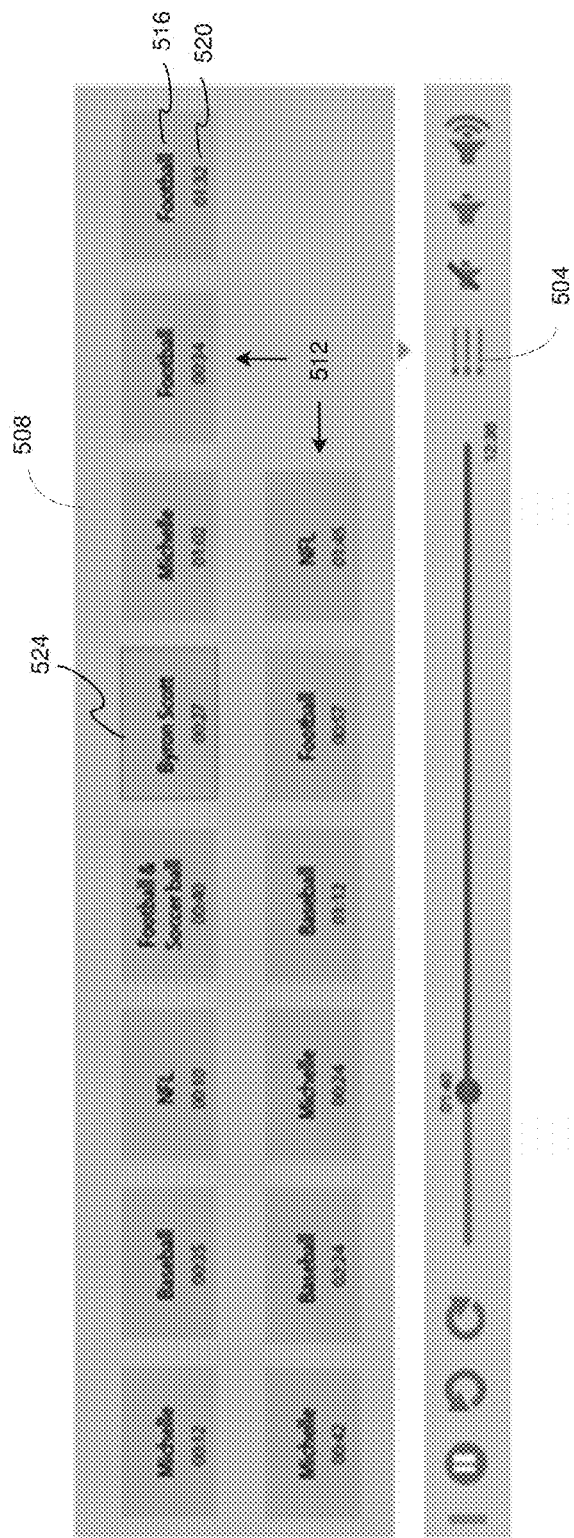
FIG. 5 depicts a portion of a display device screen display shot that includes at least one bookmark for a previously recorded or buffered content in accordance with at least one of the present embodiments.

As shown in FIG. 5, a user may select a menu item 504 to bring up a list 508 of bookmarks 512 with titles 516 and lengths 520 of bookmarks. By way of example and not limitation, the length of the bookmarks may be displayed in hours: minutes format. After the list is displayed, a particular bookmark 524 may be selected. It is to be appreciated that such selection may occur in accordance with the mechanisms provided by a given user interface device. For example, in the case of a physical remote control device, a user may click or tap to make a selection. Similarly, in the case of a virtual remote control device, a user's voice, hand gesture or the like may be used to make the selection. Further, in at least one embodiment, the selection may occur automatically, autonomously, upon user input or a combination thereof. In accordance with this selection, playback may skip to the beginning of that bookmark in the recorded or buffered video.

Figure 6:
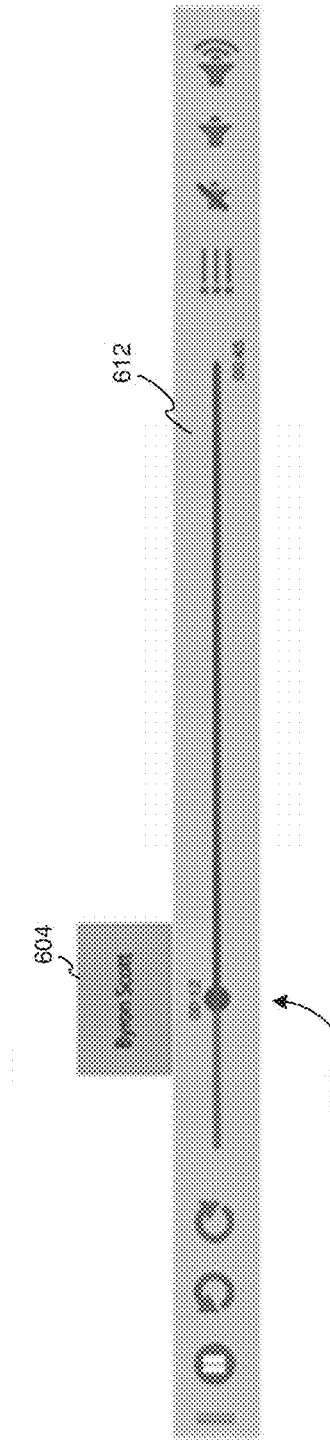
FIG. 6 depicts a portion of a display device screen shot that includes at least one bookmark displayed over a current playback position for a selected media content in accordance with at least one of the present embodiments.

As shown in FIG. 6, a display device may output a bookmark in response to a selection of a bookmark, such as those depicted in FIG. 5. In one example, a bookmark 604 may be displayed over a current playback position 608 upon selection of the particular bookmark 524 shown in FIG. 5. In another example, a bookmark 604 may be displayed over a current playback position 608 if the playback bar 612 is displayed or otherwise enabled. In another example, a bookmark 604 may be displayed over a current playback position 608 upon the skipping of the client device to a particular point in the recorded or buffered video.

As shown in FIG. 7, one or more of the bookmarks may correspond to previously recorded or buffered shows and include start and stop times for those shows. As shown in FIG. 7, upon selection a menu item 704 may be presented which includes a list 708 of bookmarks 712 with titles 716 and start stop times 720 for those bookmarks. By way of example and not limitation, the length of the bookmarks may be displayed in hours: minutes format. After the list 708 is displayed, a particular bookmark 720 may be selected. In accordance with this selection, playback may skip to the beginning of that bookmark in the recorded or buffered video.

As shown in FIG. 8, the display device may output a result of a bookmark selection that is depicted in FIG. 7. Thus, in one example, a bookmark 804 may be displayed over a current playback position 808 upon selection of the particular bookmark 720 shown in FIG. 7. In another example, a bookmark 804 may be displayed over a current playback position 808, upon the displaying of or enablement of the playback bar 812. In another example, a bookmark 804 may be displayed over a current playback position 808, upon a skipping of the client device to a particular point in the recorded or buffered video.

Figure 9:
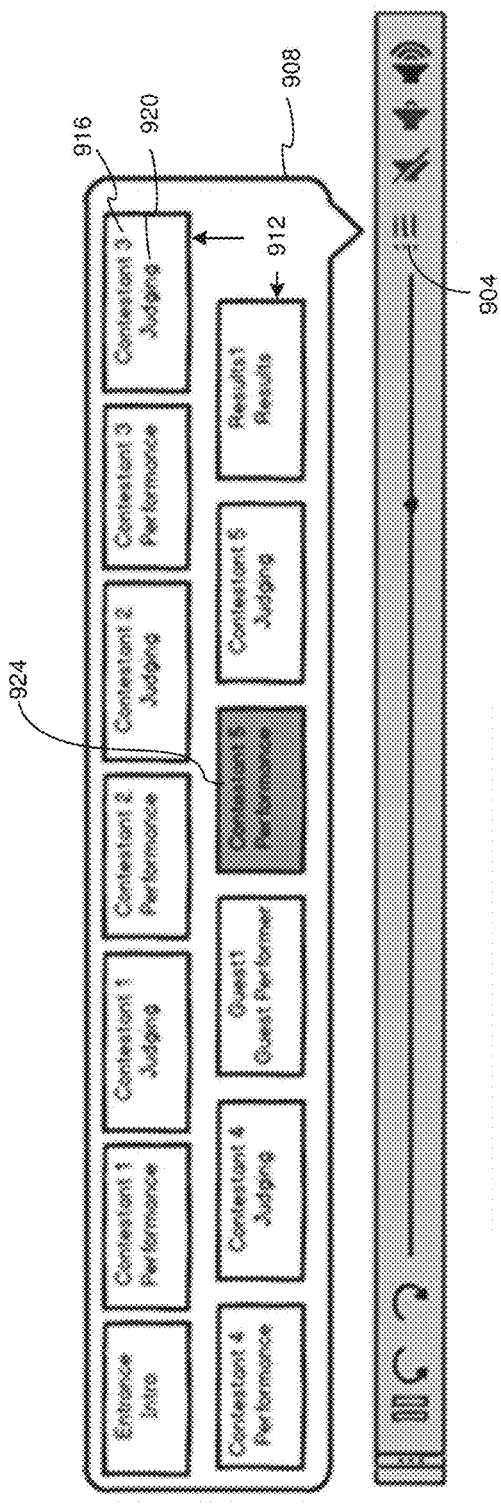
FIG. 9 depicts a portion of a display device screen shot that includes at least one bookmark that shows at least one content category for a selected media content in accordance with at least one of the present embodiments.

As shown in FIG. 9, the bookmarks may correspond to previously recorded or buffered shows and include content categories for those shows. Upon a selection of menu item 904, a list 908 of bookmarks 912 with titles 916 and category indicators 920 for those bookmarks may be presented. After the list 908 is displayed, a particular bookmark 924 may be selected. In accordance with this selection, playback may skip to the beginning of that bookmark in the recorded or buffered video.

Figure 10:
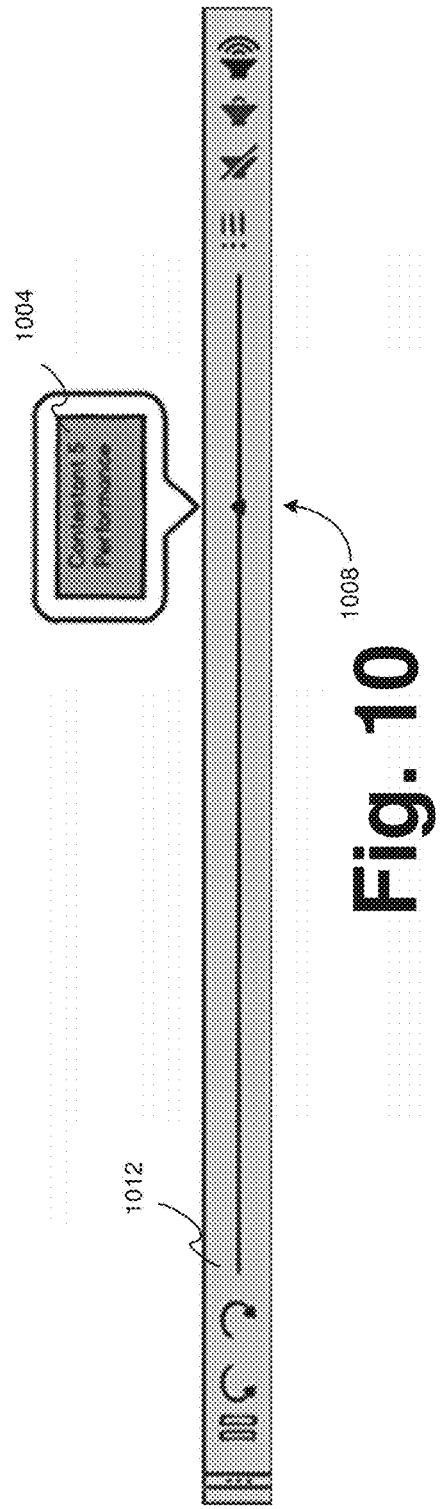
FIG. 10 depicts a portion of a display device screen shot that includes at least one bookmark displayed over a current playback position for a selected media content in accordance with at least one of the present embodiments.

As shown in FIG. 10, the display device may output a result of the bookmark selection that is depicted in FIG. 9. Thus, in one example, a bookmark 1004 may be displayed over a current playback position 1008 upon a selection on the particular bookmark 924 shown in FIG. 9. In another example, a bookmark 1004 may be displayed over a current playback position 1008, upon the displaying or otherwise enabling of the playback bar 1012. In another example, a bookmark 1004 may be displayed over a current playback position 1008, upon a skipping of the client device to a particular point in the recorded or buffered video.

Figure 11:
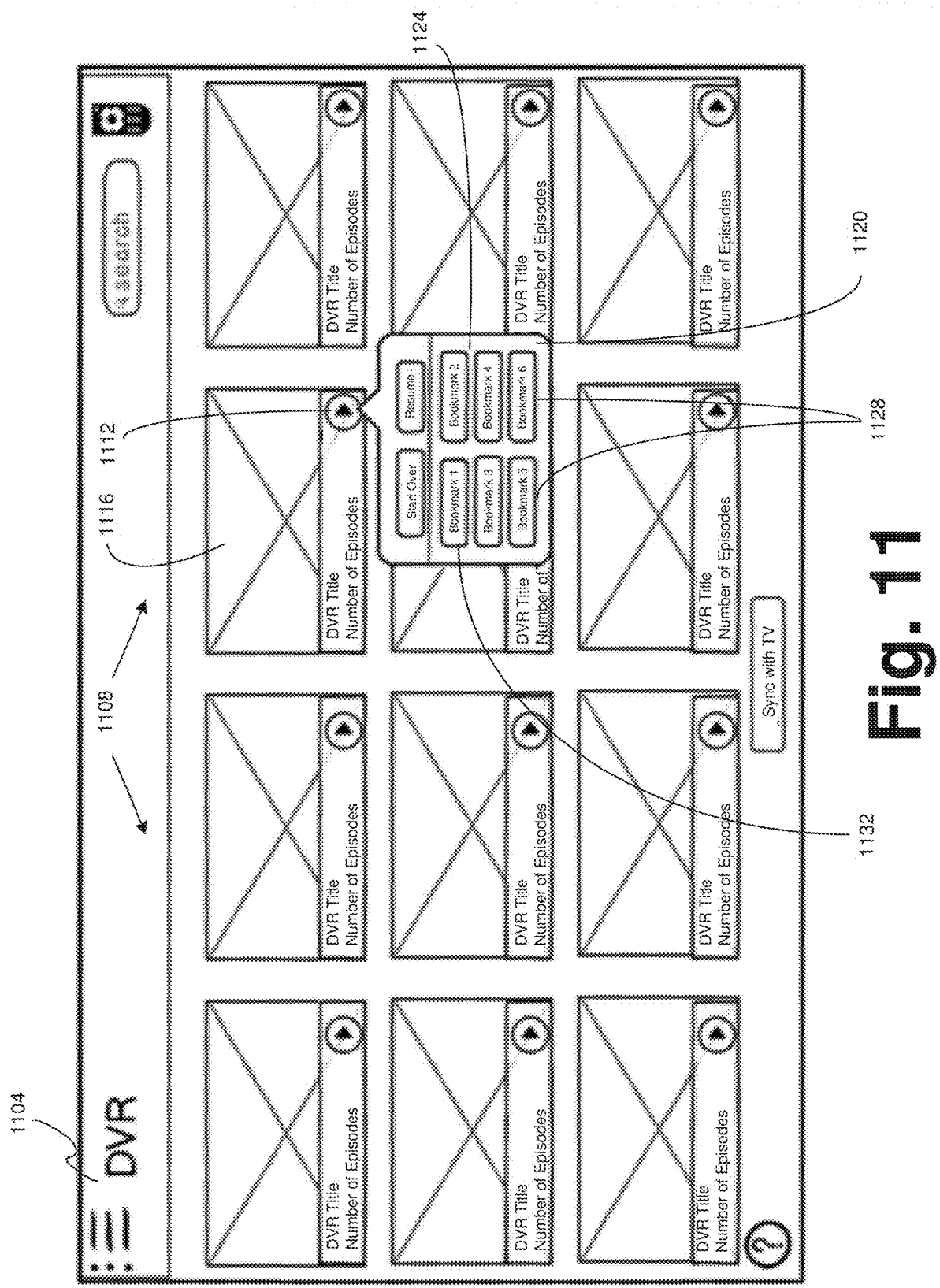
FIG. 11 depicts a portion of a display device screen shot that includes at least one bookmark that is shown as an overlay on a menu of DVR items in accordance with at least one of the present embodiments.

As shown in FIG. 11 and by way of example and not limitation, menu 1104 may arrange the plurality of DVR items 1108 into a grid pattern. The DVR items 1108 may correspond to previously recorded or download content that is available for play by the DVR. The menu 1104 of DVR items 1108 and the bookmarks that may be overlain thereon may be displayed before playback of an event or other recording. As shown in FIG. 11, upon selection of a play button 1112 associated with a particular DVR item 1116, a popup overlay 1120 may appear. This overlay 1120 may present available playback options and bookmarks 1124. In the embodiment shown in FIG. 11, the bookmarks 1124 are arranged in two adjacent columns 1128. After the overlay 1120 appears, a particular bookmark 1132 may be selected. In accordance with this selection, playback of the recorded or buffered event may begin at the start time of the bookmark. Once playback begins, a relevant bookmark may be displayed over a current playback position as shown, for example, in FIGS. 6, 8, 10.

Figure 12:
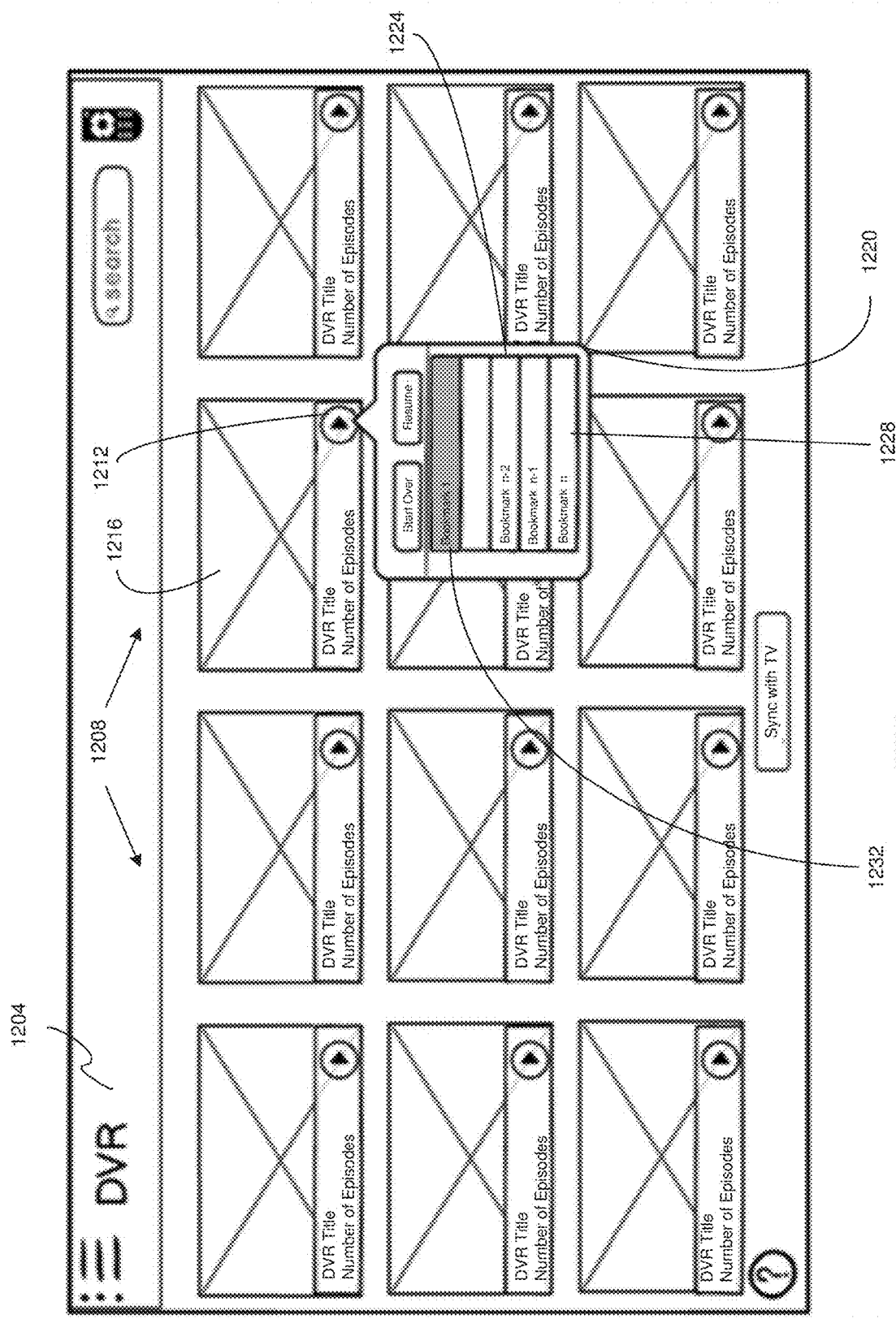
FIG. 12 depicts a display device screen shot that includes one or more bookmarks which are shown as an overlay on a menu of DVR items in accordance with at least one of the present embodiments.

By way of example and not limitation, menu 1204 shown in FIG. 12 arranges the plurality of DVR items 1208 in a grid pattern. The DVR items 1208 may correspond to previously recorded or downloaded content that is available for play by the DVR. The menu 1204 of DVR items 1208 and the bookmarks that may be overlain thereon may be displayed before playback of an event or other recording. As shown in FIG. 12, upon selection of a play button 1212 associated with a particular DVR item 1216, a popup overlay 1220 presents available playback options and bookmarks 1224. In the example of FIG. 12, the bookmarks 1224 are arranged in a single column 1228. After the overlay 1220 appears, a particular bookmark 1232 may be selected. In accordance with this selection, playback of the recorded or buffered event may begin at the start time of the bookmark. Once playback begins, a relevant bookmark may be displayed over a current playback position as shown, for example, in FIGS. 6, 8, 10.

Figure 13:
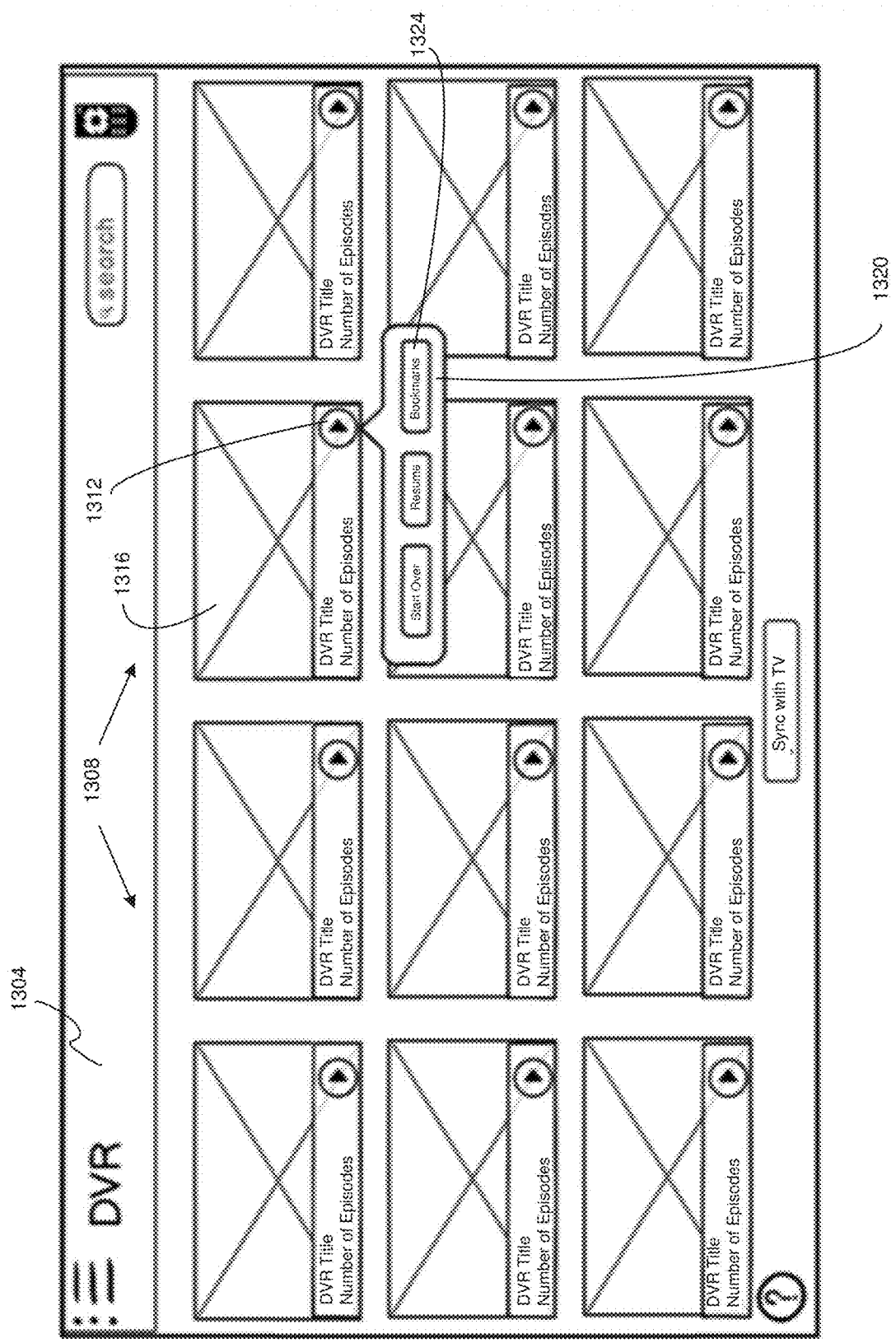
FIG. 13 depicts a display device screen shot that includes one or more bookmarks that are shown as an overlay on a menu of DVR items in accordance with at least one of the present embodiments.
Figure 14:
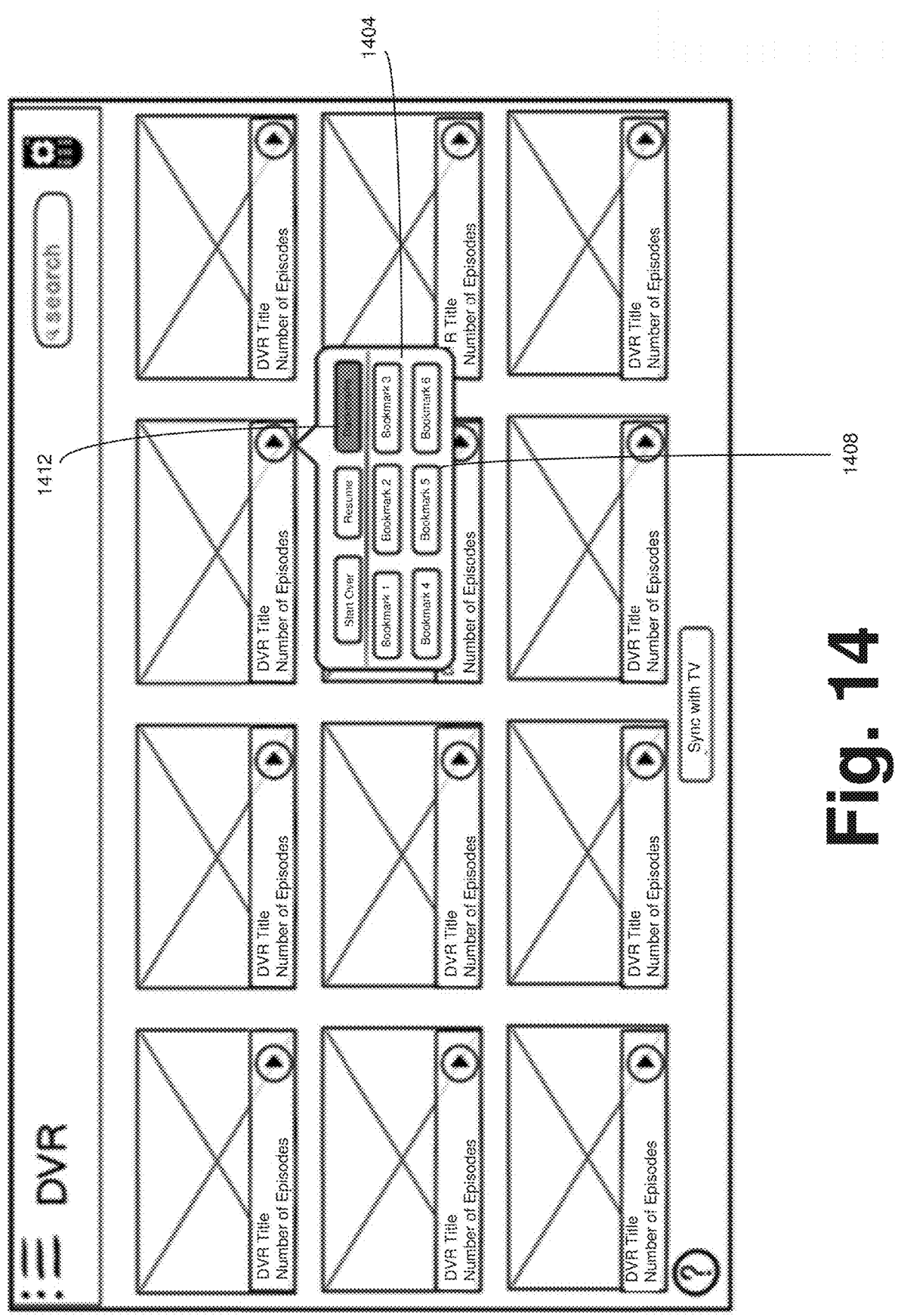
FIG. 14 depicts a display device screen shot that includes a second overlay including a list of bookmarks for one or more selected media content in accordance with at least one of the present embodiments.

By way of example and not limitation, menu 1304 shown in FIG. 13 arranges the plurality of DVR items 1308 in a grid pattern. The DVR items 1308 may correspond to previously recorded or download content that is available for play by the DVR. The menu 1304 of DVR items 1308 and the bookmarks that may be overlain thereon may displayed before playback of an event or other recording. As shown in FIG. 13, upon selection of a play button 1312 associated with a particular DVR item 1316, a popup overlay 1320 presents available playback options and an option 1324 to display the list of available bookmarks. Upon selection of the display option 1324, a second overlay 1404 (FIG. 14) including a list 1408 of bookmarks may be displayed. After the second overlay 1404 appears, a particular bookmark 1412 may be selected. In accordance with this selection, playback of the recorded or buffered event may begin at the start time of the bookmark. Once playback begins, a relevant bookmark may be displayed over a current playback position as shown, for example, in FIGS. 6, 8, 10.

Figure 15:
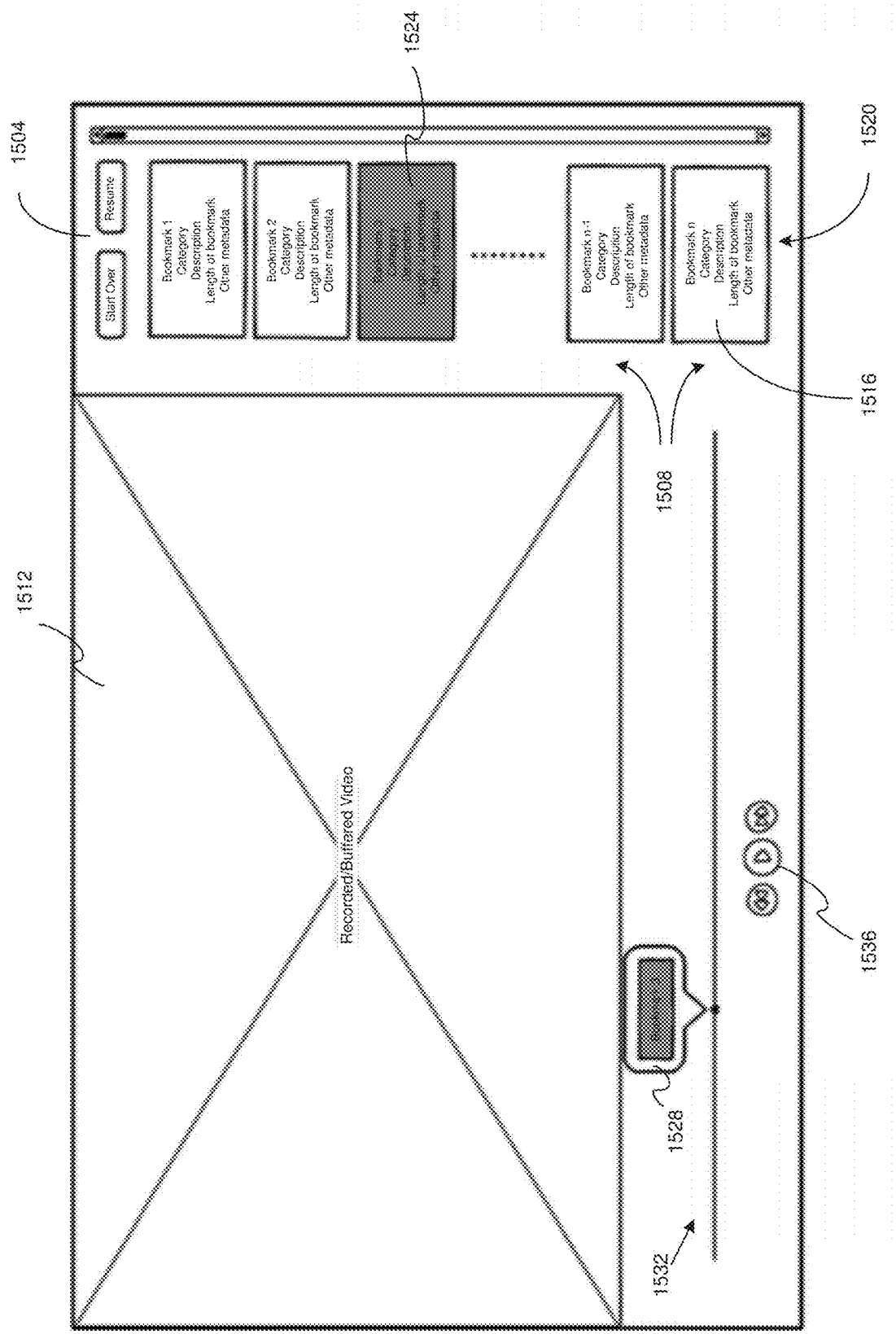
FIG. 15 depicts a display device screen shot that displays a menu of bookmarks alongside video output for a selected media content in accordance with at least one of the present embodiments.

As shown in FIG. 15 for at least one embodiment, the bookmarks 1508 are displayed as and selected from one or more lists 1516. Various fields of metadata can be displayed within lists 1516 included within the bookmark. By way of example and not limitation, the menu 1504 shown in FIG. 15 arranges the bookmarks 1508 in a column 1520 on one side of the display output. The bookmarks 1508 may correspond to previously recorded or downloaded content that is available for play at a STB. As shown in FIG. 15, upon selection of a particular bookmark 1524, playback skips to the start of the selected bookmark 1528 and a popup 1532 appears over the play head 1536 to indicate the current bookmark.

Figure 16:
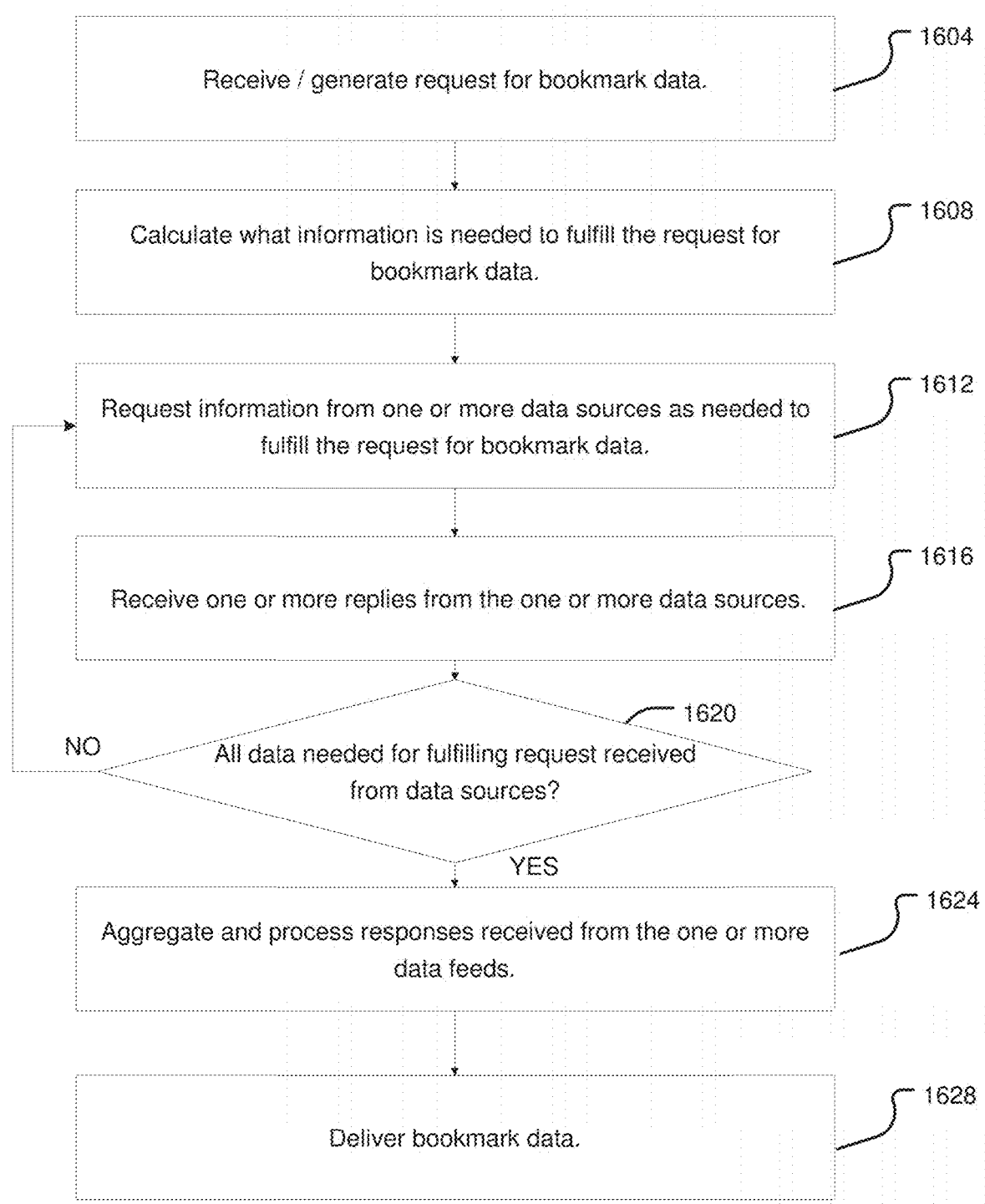
FIG. 16 depicts a flow chart illustrating a method of processing a request for bookmarking data in accordance with at least one of the present embodiments.

As shown in FIG. 16, a method for processing a request for bookmarking data may be executed by the server 108 or component thereof depicted in FIGS. 1 and 4. In operation 1604, the server 108 receives and/or generates a request for bookmark data. In operation 1608, the server 108 determines what information is needed to fulfill the request for bookmark data. In operation 1612, the server 108 requests information from one or more data sources as needed to fulfill the request for bookmark data. In operation 1616, the server 108 receives one or more replies from the one or more data sources. The server may then repeat one or more of the above operations until the server determines that all information needed for generating the requested bookmark has been received. Thus, in operation 1620, the server 108 may determine if all data needed for fulfilling the request has been received from the data sources. If not, operation 1612 may again be executed following operation 1620. If so, operation 1628 may be executed following operation 1620. In operation 1624, the server 108 aggregates and processes the responses received from the one or more data feeds. In operation 1628, the server 108 delivers the bookmark data to the client device 104.

In one example, the request for bookmarking data may originate in the client device 104. In this embodiment, the client device 104 requests bookmarking information and passes the necessary data to fulfill the request to the server 108, which receives the request in operation 1604. The data passed to the server in operation 1604 may include currently playing info, current position of the play head, type of information requested, and the like. In this implementation, the information requested by the client device 104 is delivered to the client device 104 responsive to the request in operation 1628. Additionally, if the request cannot be processed for any reason, the server 108 returns one or more relevant error messages to the client device 104 in operation 1628.

In another example, the request for bookmarking data may originate in the server 108. In this embodiment, the data processing and aggregating server 108 generates its own request to create bookmarking data and initiates processing of that request in operation 1604. The request is then processed as described above in connection with other embodiments, including operation 1628 where the bookmarking data is delivered to the client device 104. Thus, in this example, the data processing and aggregating server 108 delivers bookmarking data to the client device 104 without a direct request from the client device 104.

In another example, the request for bookmarking data may originate in an external server 120. In this embodiment, the external server 120 requests bookmarking information and passes the necessary data to fulfill the request to the server 108, which receives the request in operation 1604. In this implementation, the information requested by the client device 104 is delivered to the client device 104 responsive to the request from the external server 120 in operation 1628. In this example, the server 108 additionally sends, in operation 1628, an acknowledgement of the delivery of the bookmark data to the external server 120 that generated the request. If the request cannot be processed for any reason, the server 108 returns relevant error messages to the external server 120 and/or the client device 104 in operation 1628.

In another example, the request for bookmarking data may originate in a data feed 116. In this embodiment, the data feed 116 requests bookmarking information and passes the necessary data to fulfill the request to the server 108, which receives the request in operation 1604. In this implementation, the information requested by the client device 104 is delivered to the client device 104 responsive to the request from the data feed in operation 1628. In this regard, the data processing and aggregating server 108 may deliver the bookmarking data to the client device 104 with an update request from the data feed 116.

Identifying Content and Commercial Spots

FIGS. 17-22 depict screenshots of a user interface presented to a user from a set-top box or other client device 104. User interfaces depicted in FIGS. 17-22 may include an interface or guide for a DVR or other recording device. A user interface may allow the user to interact and configure a television system, including providing the user with commercial identifying information or data. Such data may be presented to the user through an on-screen guide or through any other interface menu. Generally, the user may access and interact with the user interface through a remote control. The remote control may allow the user to navigate through the various menus and options of the user interface to configure the interface as desired by the user. It should be appreciated, however, that the user may interact and provide inputs to the user interface through any I/O device, such as push-buttons located on the front of the STB.

One aspect of the user interface provided to the user may be requesting and/or using commercial identifying information provided by a data processing and aggregating server 108. A data processing and aggregating server 108 in accordance with the present disclosure may use or parse a data feed to identify content and commercial spots in the recorded or buffered video and optionally replacing that commercial segment with another video feed/spot or image. By way of example, the server 108 may use or parse a data feed that identifies a single or multiple successive (aggregate) commercial segment(s). By way of example and not limitation, a data feed for a commercial segment may contain descriptive information such as the start time of a commercial, the end time of the commercial, the length of the commercial, the title of the commercial, the category of the commercial (insurance, automobile, pharmaceutical, political, or the like), and a commercial description. These identifiers can be presented to the user in various ways, as shown in FIGS. 17-22.

Figure 17:
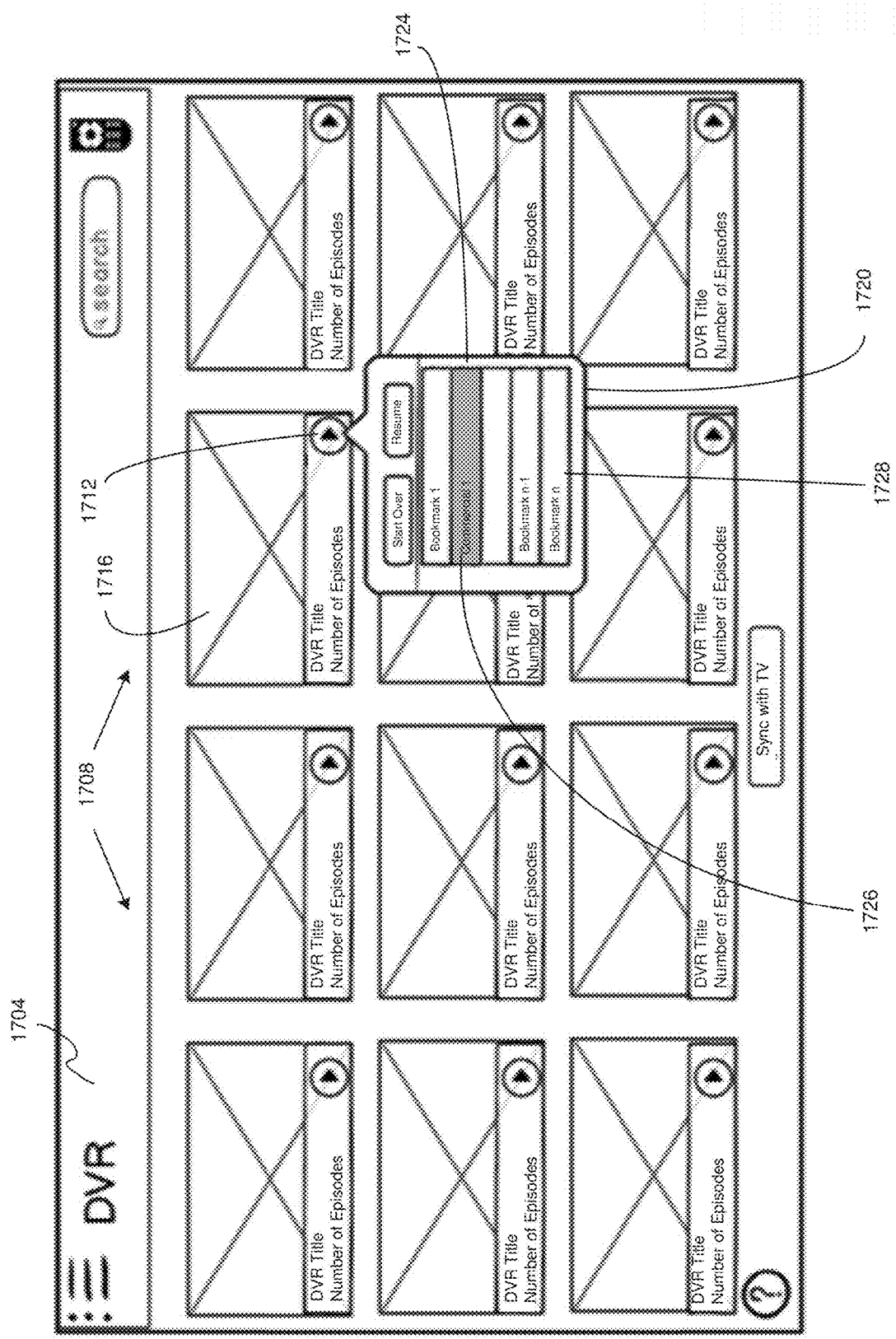
FIG. 17 depicts a display device screen shot that includes at least one bookmark providing an identification of a commercial and is shown as an overlay on a menu of DVR items in accordance with at least one of the present embodiments.

As shown in FIG. 17 and by way of example and not limitation, the menu 1704 may arrange the plurality of DVR items 1708 in a grid pattern. The DVR items 1708 may correspond to previously recorded or downloaded content that is available for play by the DVR. The menu 1704 of DVR items 1708 and the bookmarks that may be overlain thereon may be displayed before playback of an event or other recording. As shown in FIG. 17, upon selection of a play button 1712 associated with a particular DVR item 1716, a popup overlay 1720 presents available user playback options and bookmarks 1724. At least one of the bookmarks 1724 may be a commercial identification bookmark 1726. In the example of FIG. 17, the bookmarks 1724 including the at least one commercial identification bookmark 1726 are arranged in a single column 1728. After the overlay 1720 appears, a particular commercial identification bookmark 1726 may be selected. In accordance with this selection, playback of the recorded or buffered event begins at the start time of the commercial.

Figure 18:
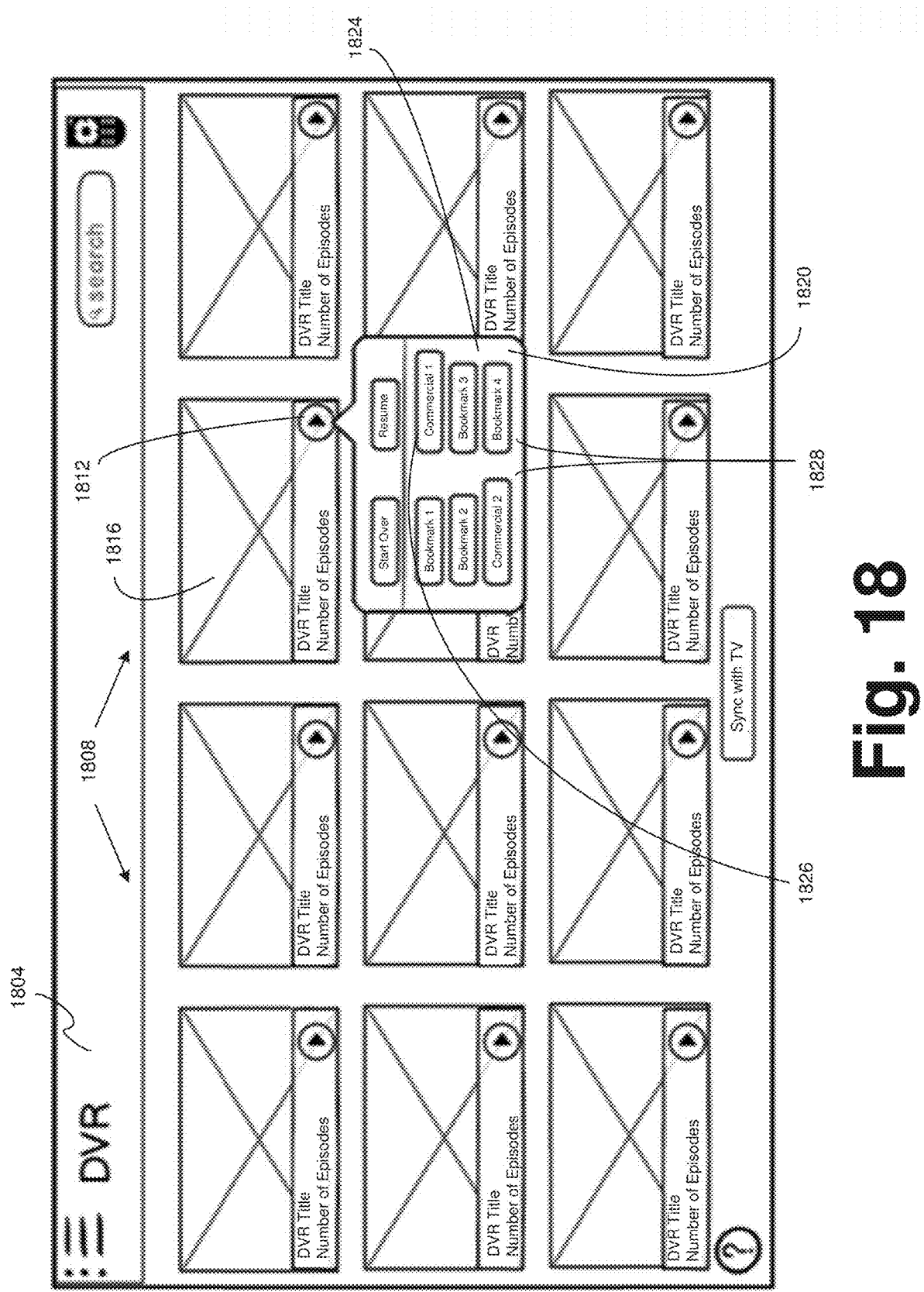
FIG. 18 depicts a display device screen shot that includes at least one bookmark providing an identification of a commercial and is shown as an overlay on a menu of DVR items in accordance with at least one of the present embodiments.

As shown in FIG. 18 and by way of example and not limitation, the menu 1804 may arrange the plurality of DVR items 1808 in a grid pattern. The DVR items 1808 may correspond to previously recorded or downloaded content that is available for play by the DVR. The menu 1804 of DVR items 1808 and the bookmarks that may be overlain thereon may be displayed before playback of an event or other recording. As shown in FIG. 18, upon selection of a play button 1812 associated with a particular DVR item 1816, a popup overlay 1820 present available user playback options and bookmarks 1824. At least one of the bookmarks 1824 may be a commercial identification bookmark 1826. In the example of FIG. 18, the bookmarks 1824 including the at least one commercial identification bookmark 1826 are arranged in two adjacent columns 1828. After the overlay 1820 appears, a particular commercial identification bookmark 1826 may be selected. In accordance with this selection, playback of the recorded or buffered event begins at the start time of the commercial.

Figure 19:
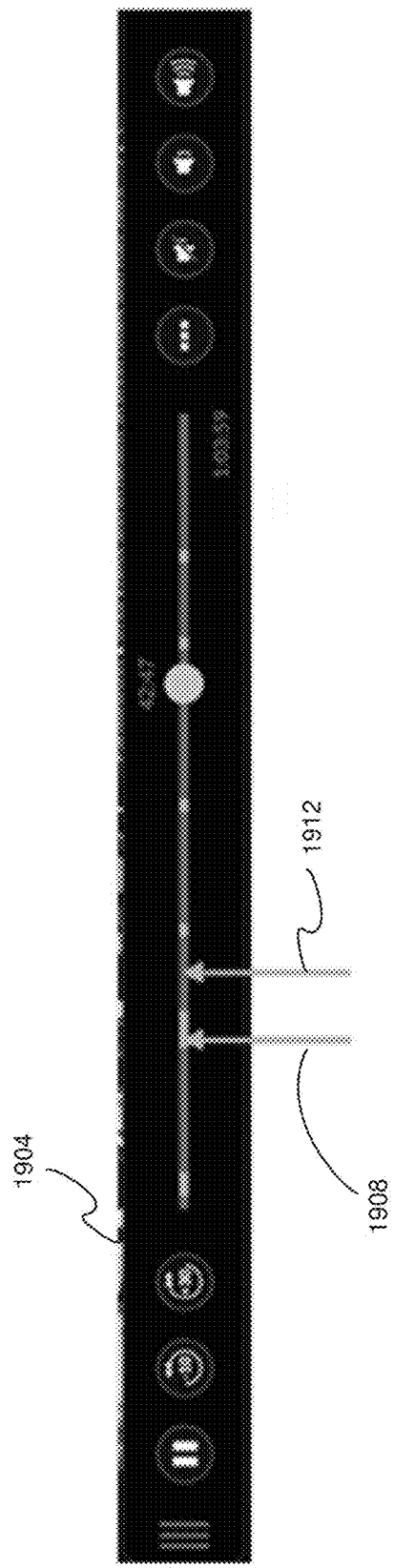
FIG. 19 depicts a portion of a display device screen shot that includes a progress bar in accordance with at least one of the present embodiments.

As shown in FIG. 19, a progress bar 1904 may correspond to a particular show or event that may be displayed in other areas of the display area. Different segments of the show or event may be indicated in different colored segments of the progress bar 1904. Thus, in accordance with various embodiments, the progress bar 1904 may be distinguished using different coloring to indicate content or commercials. As shown in FIG. 19, a first segment 1908 indicates a commercial and a second segment 1912 indicates content.

Figure 20:
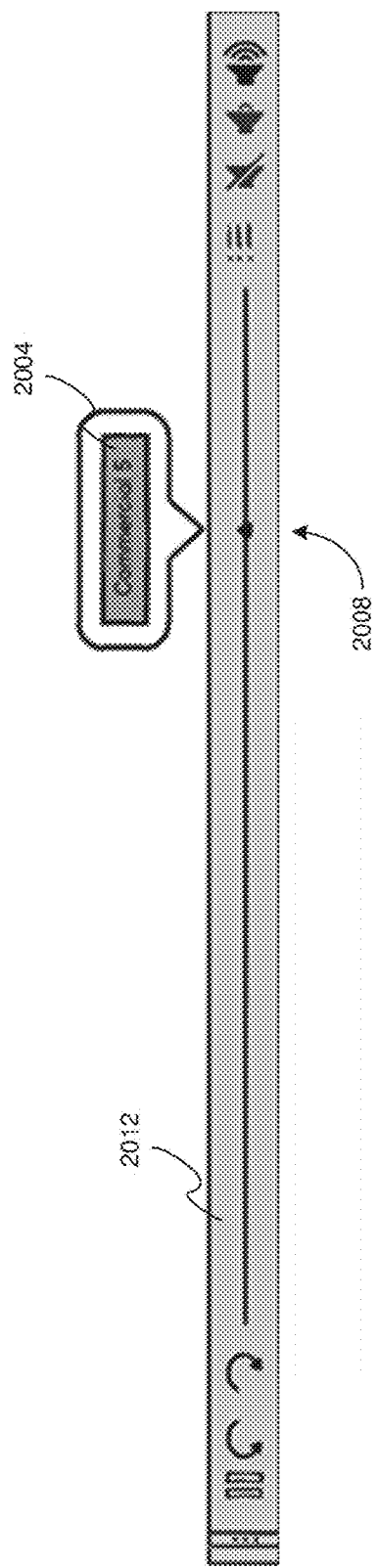
FIG. 20 depicts a portion of a display device screen shot that includes a bookmark identifying a location of a commercial as displayed over a current playback position for selected media content in accordance with at least one of the present embodiments.

As shown in FIG. 20, a display device output may be displayed as the result of the user bookmark selection that is depicted in FIG. 17 or FIG. 18. Thus, in one example, a bookmark 2004 may be displayed over a current playback position 2008 upon selection of a particular commercial indication bookmark 2004 shown in FIG. 17. In this way, a commercial is identified above the current position 2008 of the playback indicator 2012. The commercial segments may be colored based on the category (some examples include medical commercial, sports, cleaning products, automotive, mobile devices, etc.)

Figure 21:
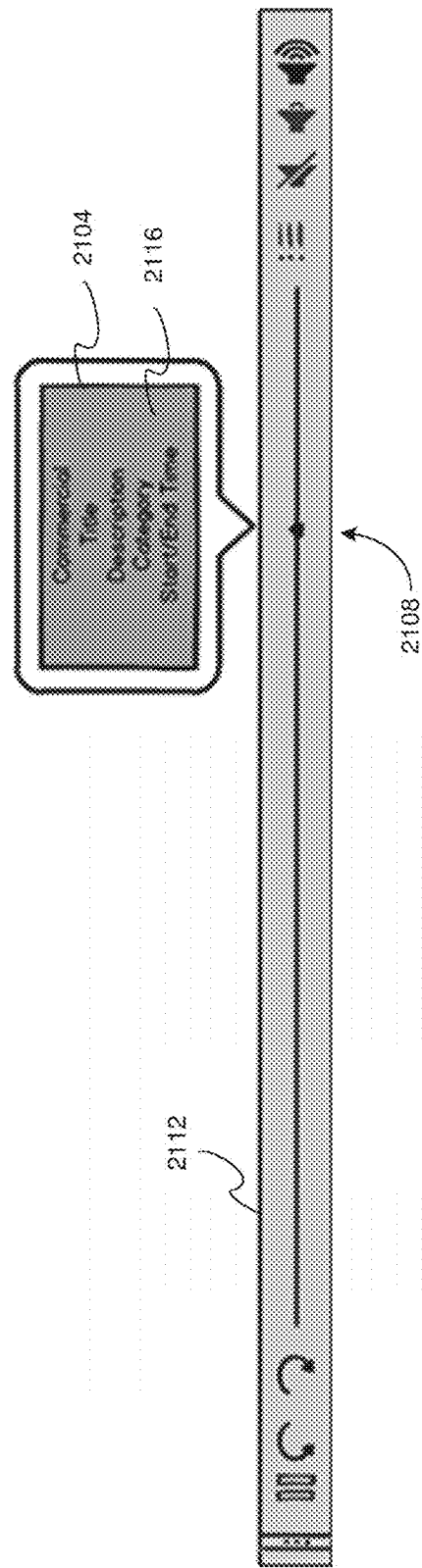
FIG. 21 depicts a portion of a display device screen shot that includes a bookmark identifying a location of a commercial as displayed over a current playback position for selected media content in accordance with at least one of the present embodiments.

As shown in FIG. 21, the bookmarks 2104 may be displayed as and selectable from lists 2116. Various fields of metadata can be displayed within a list 2116 included within the bookmark 2104. The display device output shown in FIG. 21 may be displayed as the result of the user bookmark selection that is depicted in FIG. 17 or FIG. 18. Thus, in one example, a bookmark 2104 may be displayed over a current playback position 2108 upon the selection of a particular commercial indication bookmark 2104 shown in FIG. 17. In this way, a commercial is identified above the current position 2108 of the playback indicator 2112. The commercial segments may be colored based on the category (some examples include medical commercial, sports, cleaning products, automotive, mobile devices, etc.)

In accordance with some embodiments, the content identifier may be actionable. Specifically, the device may be instructed, for example upon a user pressing a single button (or multiple) on a remote (physical or on screen), to skip over a single commercial, multiple commercials or to the beginning of the next segment of content. In some embodiments, the cursor/playback head on the progress bar may gravitate to the end of a single commercial, to the end of a commercial break or to the beginning of the next segment. Once identified, an alternate video feed can be used to replace or overlaid over a single commercial or multiple commercials.

Figure 22:
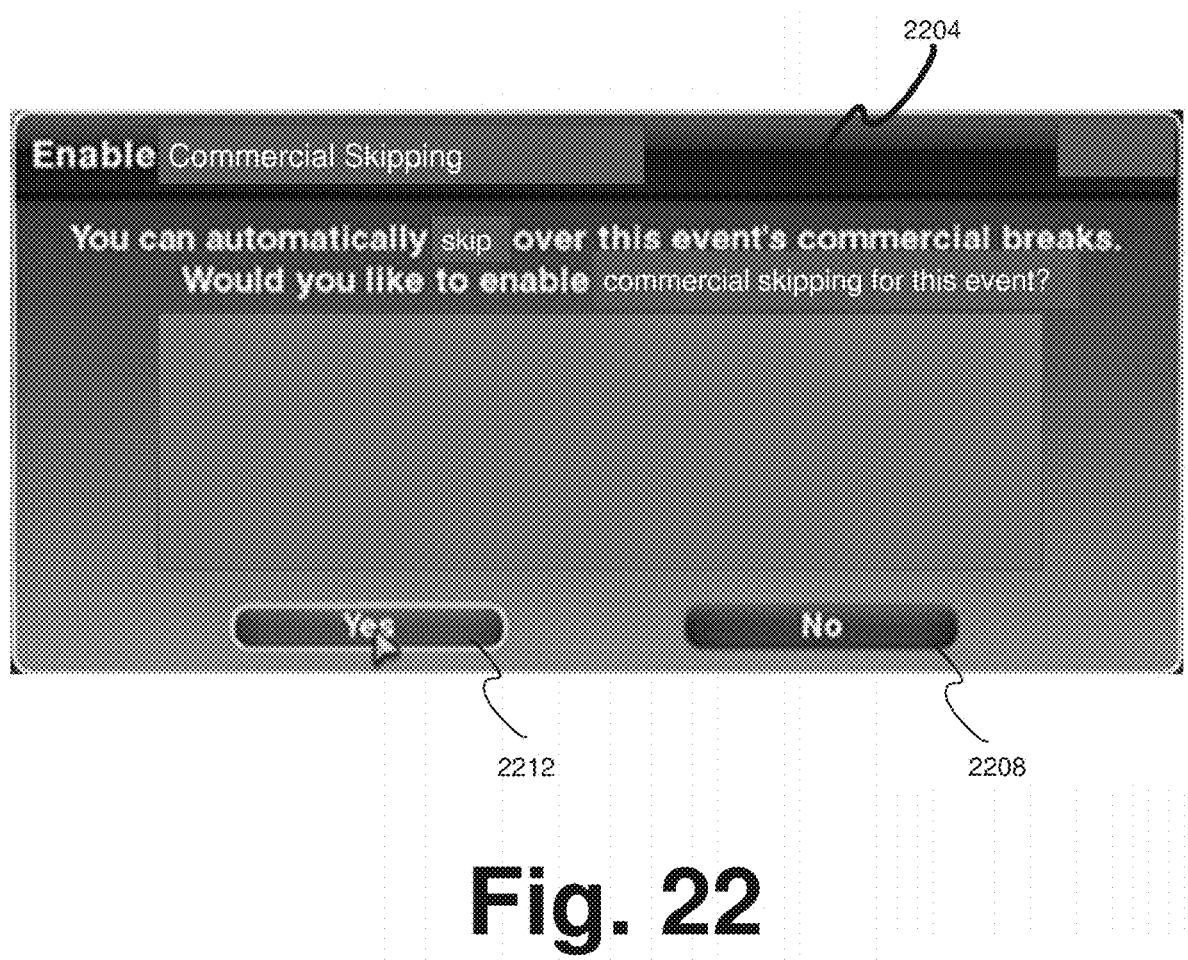
FIG. 22 depicts a portion of a display device screen shot that includes a pop-up providing a user with an option of skipping commercials when viewing recorded or downloaded content in accordance with at least one of the present embodiments.

As shown in FIG. 22, at a particular point in the operation of a DVR, the process for presenting a choice to skip commercials using this feature is user initiated. For example, before the start of (or resuming) playback of a recorded or buffered video feed, an option may be presented and enabled to automatically skip over the event's commercial breaks through a pop-up 2204, such as shown in FIG. 22. The pop-up 2204 may include a first selector 2208 that presents a first option, which may be to decline commercial skipping. The first selector 2208 may include appropriate text to indicate declining commercial skipping, such as "No" or "No Thanks." The first option may be selected by clicking on the first selector 2208. In some embodiments, the first option may be selected by default. The pop-up 2204 may include a second selector 2212 that presents a second option, which may be to accept commercial skipping. The second selector 2212 may include appropriate text to indicate accepting commercial skipping, such as "Yes." The second option may be selected by clicking on the second selector 2212. If the user selects yes, commercials are skipped for that event using the commercial identifiers. In some embodiments, commercials are skipped (by fast forwarding through the recorded content) for the event and the skipped content is not deleted from the recording.

Embodiments that include the automated skipping feature may use or parse a data feed to automate the skipping of commercials. Here, the embodiment may use a data feed to identify and automatically skip over commercial breaks in a recorded or buffered video feed. By way of example and not limitation, the identification of a commercial segment may contain information such as the start time of a commercial, the end time of a commercial, the length of a commercial, the title of a commercial, the category of a commercial (insurance, automobile, pharmaceutical, political, etc.), and/or a commercial description.

Figure 23:
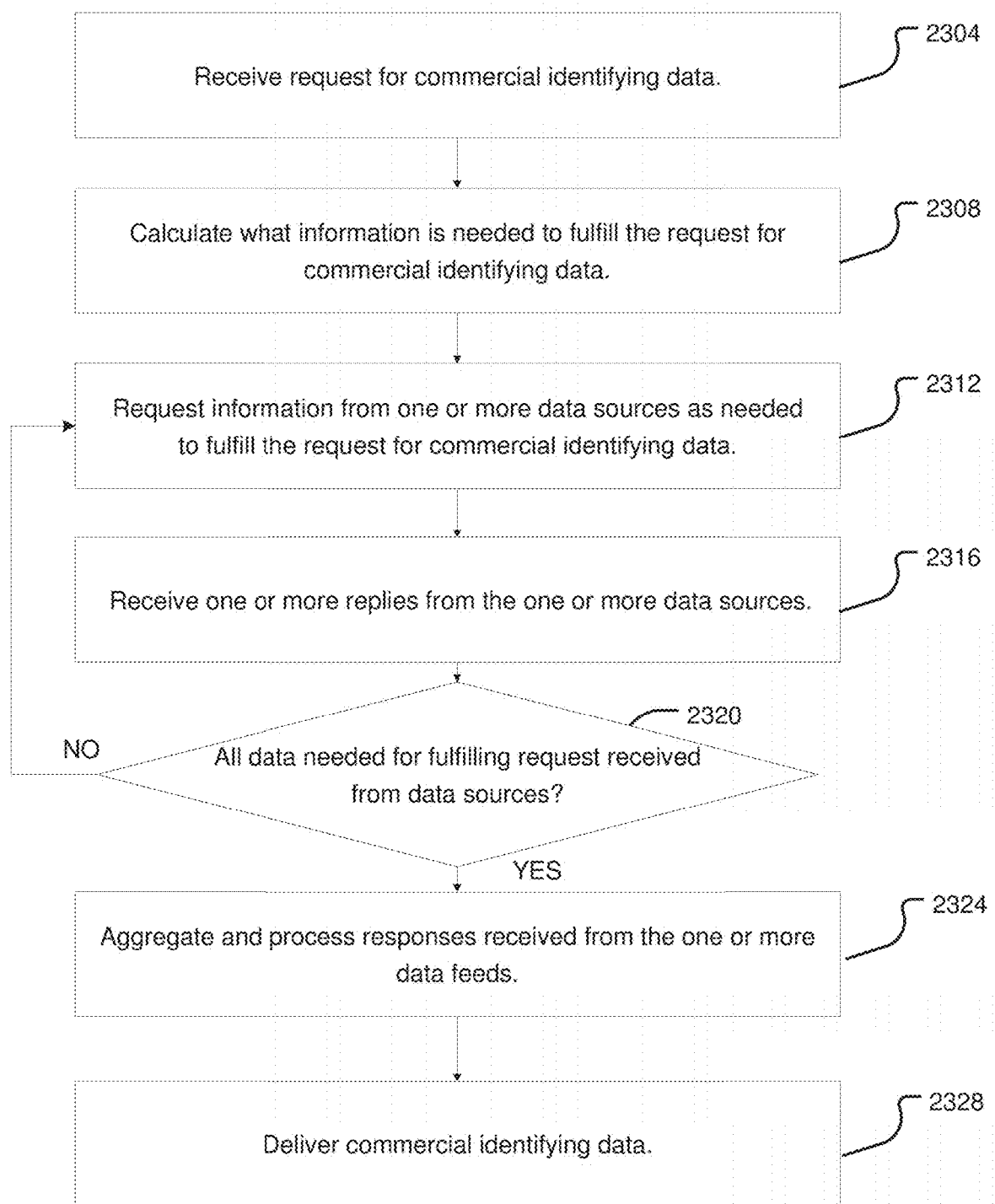
FIG. 23 depicts a flow chart illustrating a method of processing a request for commercial identifying data in accordance with at least one of the present embodiments.

As shown in FIG. 23, one method for processing a request for commercial identifying data is depicted in flow chart 2300 and may be executed by the server 108 or component thereof depicted in FIGS. 1 and 4. In operation 2304, the server 108 receives a request for commercial identifying data. In operation 2308, the server 108 determines what information is needed to fulfill the request for commercial identifying data. In operation 2312, the server 108 requests information from one or more data sources as needed to fulfill the request for commercial identifying data. In operation 2316, the server 108 receives one or more replies from the one or more data sources. The server may then repeat one or more of the above operations until the server determines that all information needed for generating the requested commercial identifying data has been received. Thus, in operation 2320, the server 108 may determine if all data needed for fulfilling the request has been received from the data sources. If not, operation 2312 may again be executed following operation 2320. If so, operation 2328 may be executed following operation 2320. In operation 2324, the server 108 aggregates and processes the responses received from the one or more data feeds. In operation 2328, the server 108 delivers the commercial identifying data to the client device 104.

In one example, the request for commercial identifying data may originate in the client device 104. In this embodiment, the client device 104 requests commercial identifying data and passes the necessary data to fulfill the request to the server 108, which receives the request in operation 2304. The data passed to the server in operation 2304 may include currently playing program info, a list of recordings along with title and content ID's, current position of a play head, etc. In this implementation, the information requested by the client device 104 is delivered to the client device 104 responsive to that request in operation 2328. Additionally, if the request cannot be processed for any reason, the server 108 returns relevant error messages to the client device 104 in operation 2328.

In another example, the request for commercial identifying data may originate in an external server 120. In this embodiment, the external server 120 requests commercial identifying data and passes the necessary data to fulfill the request to the server 108, which receives the request in operation 2304. In this implementation, the information requested by the external server 120 is delivered to the client device 104 in response to the request from the external server 120 in operation 2328. In this example, the server 108 additionally sends, in operation 2328, an acknowledgement of the delivery of the commercial identifying data to the external server 120 that generated the request. If the request cannot be processed for any reason, the server 108 returns relevant error messages to the external server 120 and/or the client device 104 in operation 2328.

The client device 104 may use commercial identifying data to automatically skip commercials in embodiments that provide for that option. Here, the client device 104 uses the data to skip over commercials during playback of the recorded or buffered content for the show if a user exercises the option. Individual commercials may also be skipped over with a click of a button. In some cases, the client device 104 and the commercials can be skipped for recorded or buffered content if initiated by the user.

Skipping Over Age Restricted Content

Figure 24:
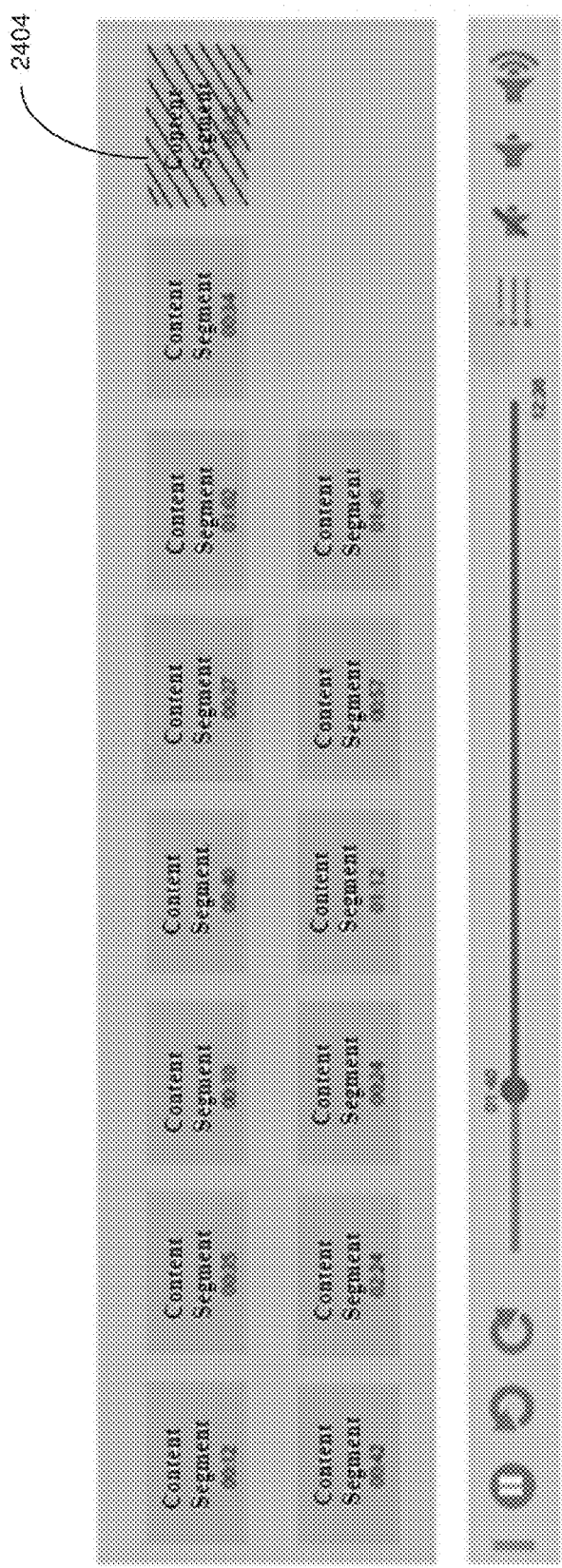
FIG. 24 depicts a portion of a display device screen shot that includes an age restriction indication provided in a popup in accordance with at least one of the present embodiments.
Figure 25:
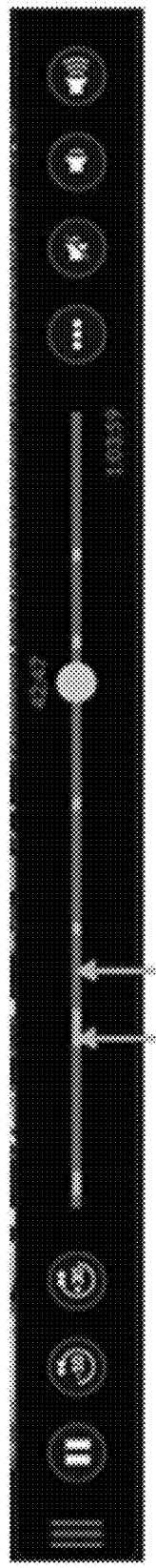
FIG. 25 depicts a portion of a display device screen shot that includes an age restriction indication provided in a progress bar in accordance with at least one of the present embodiments.
Figure 26:
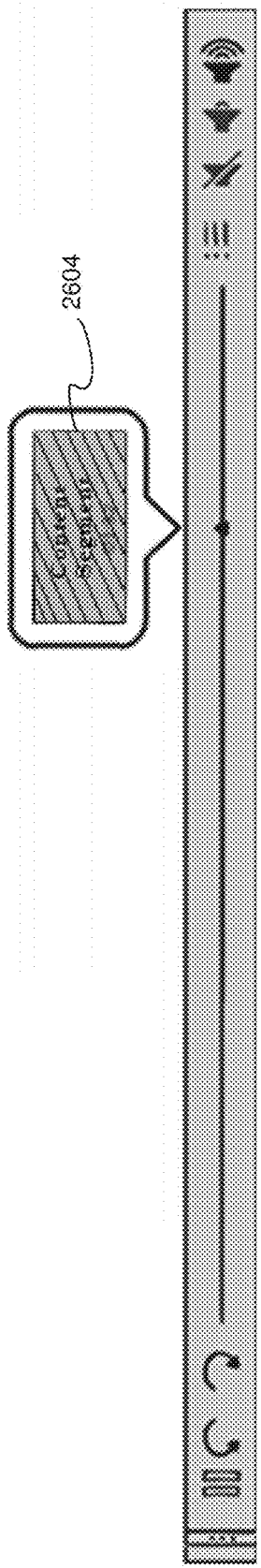
FIG. 26 depicts a portion of a display device screen shot that includes an age restriction indication provided above the current moment of playback in the progress bar in accordance with at least one of the present embodiments.

FIGS. 24-26 depict screenshots of a user interface presented to a user from a set-top box or other client device 104. User interfaces depicted in FIGS. 24-26 may include an interface or guide for a DVR or other recording device. A user interface may allow the user to interact and configure a television system, including providing options and information for skipping over age restricted content. Such options and information may be presented to the user through an on-screen guide or through any other interface menu. Generally, the user may access and interact with the user interface through a remote control. The remote control may allow the user to navigate through the various menus and options of the user interface to configure the interface as desired by the user. It should be appreciated, however, that the user may interact and provide inputs to the user interface through any I/O device, such as push-buttons located on the front of the STB.

One aspect of the user interface provided to the user may be selecting options and receiving information for skipping over age restricted content provided by a data processing and aggregating server 108. A data processing and aggregating server 108 in accordance with the present disclosure may use or parse a data feed to skip over age restricted material in the recorded or buffered video and optionally replace the skipped material with another video feed or image. Age restriction may be identified by standard rating or by third party providers that classify content based on age of the target viewer. By way of example, the server 108 may use or parse a data feed that identifies age restricted content. By way of example and not limitation, a data feed that identifies age restricted content may contain descriptive information such as rating information (G, PG, PG-13, R, NC-17, NR/AO, TV-Y, TV-Y7, TV-G, TV-PG, TV-14, TV-MA, etc.), start time, end time, length, title, description, category (strong language, violence, nudity, etc.).

These identifiers can be presented to the user in various ways as shown in the example configurations of FIGS. 24-26. In FIG. 24, an age restriction indication 2404 is provided in a popup after a user selects play/resume/start over. In FIG. 25, an age restriction indication 2504 is provided in a progress bar for the show/event (different colored segments of progress bar). In FIG. 26, an age restriction indication 2604 is provided above the current moment of playback in the progress bar.

In accordance with at least one embodiment, the content identifier may be actionable. Specifically, the users may be allowed to press a single button (or multiple) on a remote (physical or on screen) to skip over a single commercial, multiple commercials or to the beginning of the next segment of content. In some embodiments, the cursor/playback head on the progress bar may gravitate to the end of a single commercial, to the end of a commercial break or to the beginning of the next segment. Once identified, an alternate video feed can be used to replace or overlay a single commercial or multiple commercials. In accordance with some embodiments, the age restricted segments may be colored based on the category. In some embodiments, the content identifier may be actionable. Specifically, the users may be allowed to press a single button (or multiple) on a remote (physical or on screen) to skip over a single age restricted segment, multiple age restricted segment or to the beginning of the next age unrestricted segment of content. In some embodiments, the cursor/playback head on the progress bar may gravitate to the end of a single age restricted segment, to the end of an age restricted segment or to the beginning of the next age unrestricted segment. Users may restrict certain segments in parental control settings or before the start of a recorded or buffered event. Once identified, a single age restricted segment or multiple age restricted segments can be skipped overusing the information from the data feed. Alternatively, once identified, a single age restricted segment or multiple age restricted segments can be replaced or overlaid with another video feed using the information from the data feed.

Figure 27:
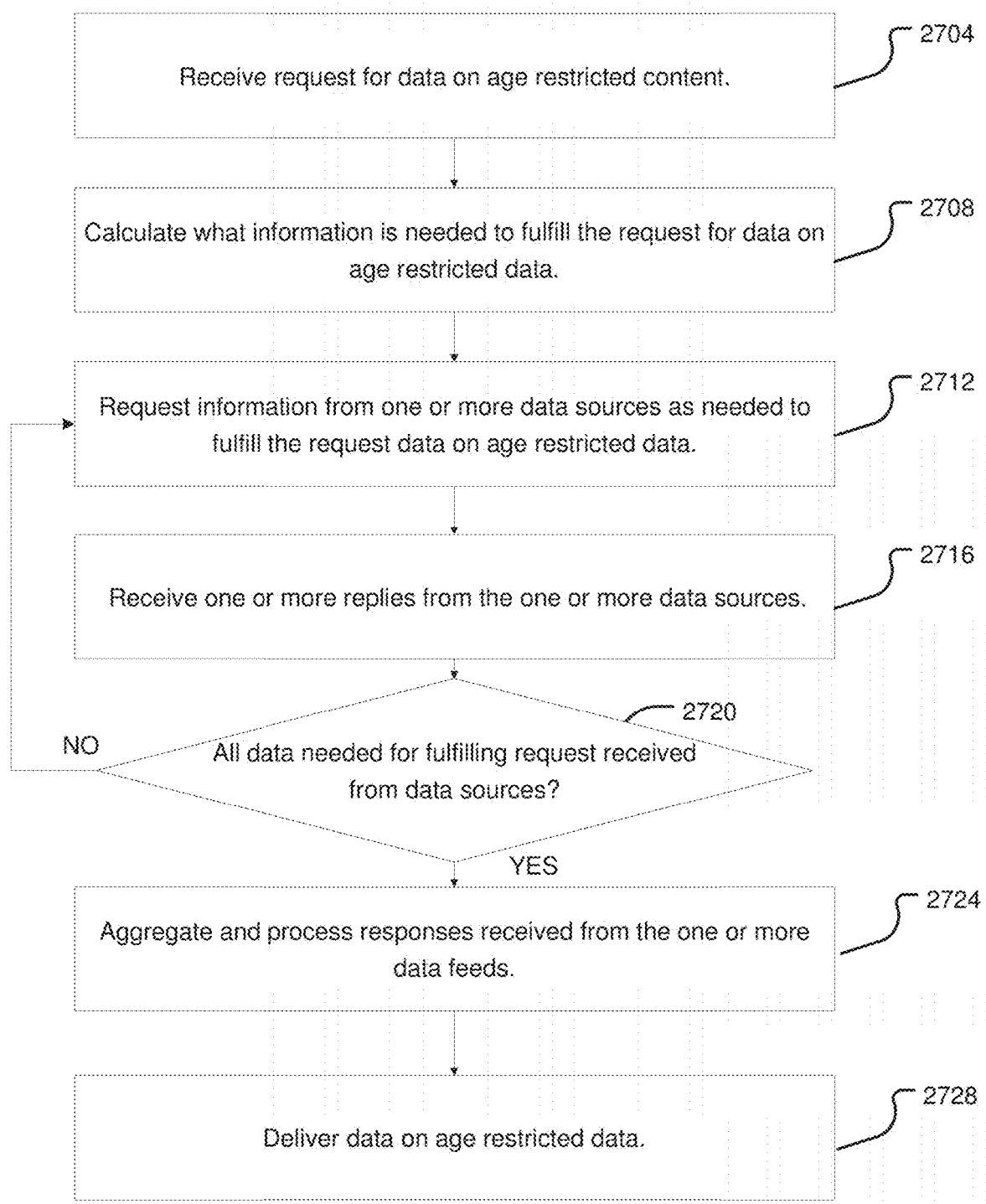
FIG. 27 depicts a flow chart illustrating a method of processing a request for data on age restricted content in accordance with at least one of the present embodiments.

As shown in FIG. 27, a method of processing a request for data on age restricted content, as depicted in flow chart 2700, may be executed by the server 108 or component thereof depicted in FIGS. 1 and 4. In operation 2704, the server 108 receives and/or generates a request for data on age restricted content. In operation 2708, the server 108 determines what information is needed to fulfill the request for data on age restricted content. In operation 2712, the server 108 requests information from one or more data sources as needed to fulfill the request for data on age restricted content. In operation 2716, the server 108 receives one or more replies from the one or more data sources. The server may then repeat one or more of the above operations until the server determines that all information needed for generating the requested data on age restricted content has been received. Thus, in operation 2720, the server 108 may determine if all data needed for fulfilling the request has been received from the data sources. If not, operation 2712 may again be executed following operation 2720. If so, operation 2728 may be executed following operation 2720. In operation 2724, the server 108 aggregates and processes the responses received from the one or more data feeds. In operation 2728, the server 108 delivers the data on age restricted content to the client device 104.

In one example, the request for data on age restricted content may originate in the client device 104. In this embodiment, the client device 104 requests data on age restricted content and passes the necessary data to fulfill request to the server 108, which receives the request in operation 2704. The data passed to the server in operation 2704 may include currently playing info, current position of play head, type of information requested, or the like. In this implementation, the information requested by the client device 104 is delivered to the client device 104 in response to that request in operation 2728. Additionally, if the request cannot be processed for any reason, the server 108 returns relevant error messages to the client device 104 in operation 2728.

Improving Timer Accuracy

A data processing and aggregating server 108 in accordance with the present disclosure may improve a timer accuracy by using or parsing a data feed. More specifically, the server 108 may use the data feed to improve the accuracy of the start and stop time of a recording timer. By way of example, the server 108 may use or parse a data feed that identifies the start and stop time of a media content to be provided by a content source. By way of example and not limitation, a data feed that identifies the start and stop time of a media content may contain descriptive information such as the start time of event, the end of event, the length of event, the title of event, a category of event (news, sports, reality, competition, etc.), and an event description.

Using the data feed to enhance timer accuracy, the start time of the event may be corrected to reflect the actual start of the event. For example, the start time may be corrected at times such as at the time of timer creation, before the start of the event, after the start of the event, and after the end of the event. Using the data feed to enhance timer accuracy, the end time of the event may be corrected to reflect the actual start of the event. For example, the end time may be corrected at such times as at the time of timer creation, before the start of the event, after the start of the event, and after the end of the event. Using the data feed to enhance timer accuracy, embodiments may modify the length of a previously recorded or buffered event by cropping, fast forwarding or beginning playback at the start of the actual event and ending playback or cropping the extra portion of the previously recorded event.

Figure 28:
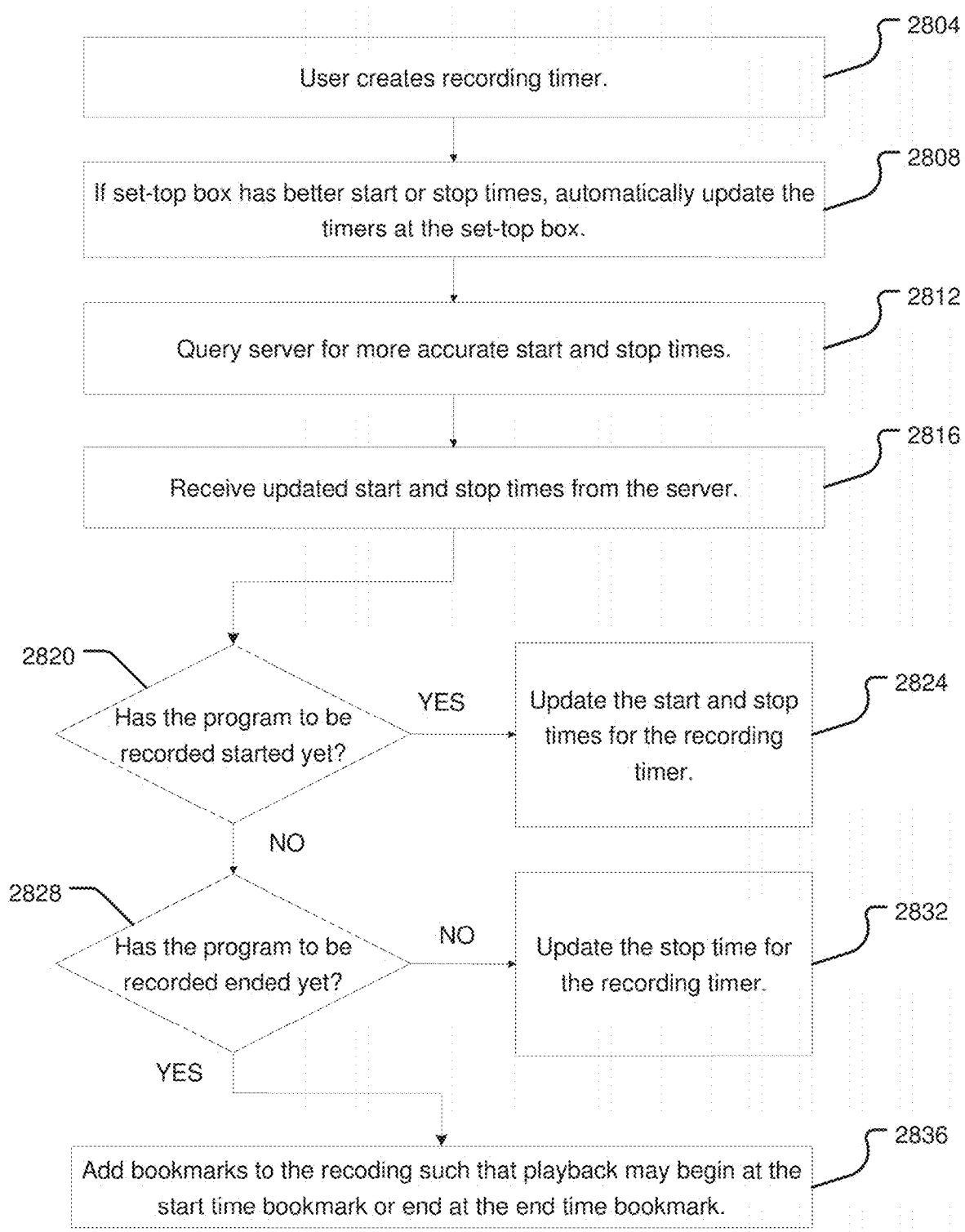
FIG. 28 depicts a flow chart illustrating a method of requesting and using data on event start and/or stop times in accordance with at least one of the present embodiments.

As shown in FIG. 28, a method of requesting and using data on event start and/or stop times, as depicted in flow chart 2800, may be executed by the client device 104 or a component thereof depicted in FIGS. 1-3. In operation 2804, a user creates a recording timer by providing appropriate inputs to the client device 104. In operation 2808, if the client device 104 has better start or stop times than those entered by the user, the client device 104 may automatically update the timers. In operation 2812, the client device 104 queries the server 108 for more accurate start and stop times. In operation 2816, the client device 104 receives updated start and stop times from the server 108. In operation 2820, the client device 104 determines if the program to be recorded has started yet. If the program has not yet started, operation 2824 may be executed following operation 2820. If the program has started, operation 2828 may be executed following operation 2820. In operation 2824, the client device 104 updates the start and stop times for the recording timer. In operation 2828, the client device 104 determines if the program to be recorded has ended yet. If the program has not yet ended, operation 2832 may be executed following operation 2828. If the program has ended, operation 2836 may be executed following operation 2828. In operation 2832, client device 104 updates the stop time for the recording timer. In operation 2836, client device 104 adds bookmarks to the recoding such that playback may begin at the start time bookmark or end at the end time bookmark. Through use of the bookmarks, a user may also have the ability to crop the recording to accurate start and end times to save space of the storage device, where the storage device is physical or in the cloud.

Manipulating Lists Based on Viewer Measurement Data

A data processing and aggregating server 108 in accordance with at least one of the various embodiments of the present disclosure may be configured to manipulate lists of viewer measurement (VM) data. By way of example, the server 108 may use or parse a data feed that provides viewer measurement statistics or similar data. A list of content ordered by VM statistics can be modified or certain elements can be highlighted using a data feed. In accordance with one or more of the various embodiments, the viewer measurement statistics are aggregated on one or more of the following levels or combination of levels such as personal, account/household level, zip code, county, city, state, national, or international. Lists can may be modified and/or individual items can be highlighted based on an external data feed. The modified list may then be delivered to the STB, client, mobile device or computer where further modification of the list may be performed.

Figure 29:
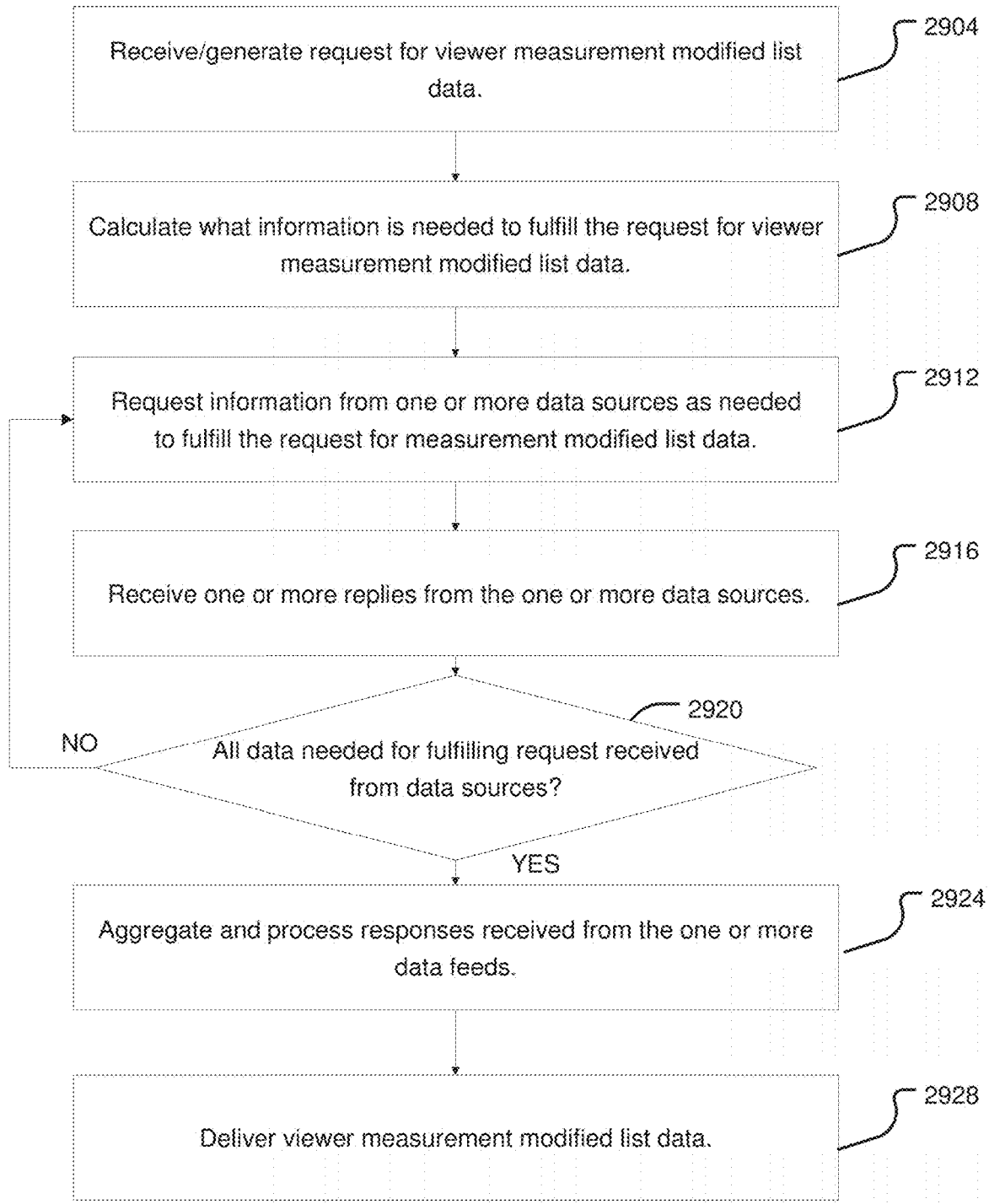
FIG. 29 depicts a flow chart illustrating a method of processing a request for viewer measurement modified list data in accordance with at least one of the present embodiments.

FIG. 29 is a flow chart 2900 that depicts a method of processing a request for viewer measurement modified list data. The method depicted in flow chart 2900 may be executed by the server 108 or components thereof depicted in FIGS. 1 and 4. In operation 2904, the server 108 receives and/or generates a request for viewer measurement modified list data. In operation 2908, the server 108 determines what information is needed to fulfill the request for viewer measurement modified list data. In operation 2912, the server 108 requests information from one or more data sources as needed to fulfill the request for viewer measurement modified list data. In operation 2916, the server 108 receives one or more replies from the one or more data sources. The server may then repeat one or more of the above operations until the server determines that all information needed for generating the requested viewer measurement modified list data has been received. Thus, in operation 2920, the server 108 may determine if all data needed for fulfilling the request has been received from the data sources. If not, operation 2912 may again be executed following operation 2920. If so, operation 2928 may be executed following operation 2920. In operation 2924, the server 108 aggregates and processes the responses received from the one or more data feeds. In operation 2928, the server 108 delivers the viewer measurement modified list data to the client device 104.

In one example, the request for viewer measurement modified list data may originate in the client device 104. In this embodiment, the client device 104 requests viewer measurement modified list data and passes the necessary data to fulfill request to the server 108, which receives the request in operation 2904. The data passed to the server in operation 2904 may include currently playing info, current position of play head, type of information requested, or the like. In this implementation, the information requested by the client device 104 is delivered to the client device 104 responsive to that request in operation 2928. Additionally, if the request cannot be processed for any reason, the server 108 returns relevant error messages to the client device 104 in operation 2928.

In another example, the request for viewer measurement modified list data may originate in the server 108. In this embodiment, the data processing and aggregating server 108 generates its own request to create viewer measurement modified list data and initiates processing of that request in operation 2904. The request is then processed as described above in connection with other embodiments, including operation 2928 where the viewer measurement modified list data is delivered to the client device 104. Thus, in this example, the data processing and aggregating server 108 delivers viewer measurement modified list data to the client device 104 without a direct request from the client device 104.

In another example, the request for viewer measurement modified list data may originate in an external server 120. In this embodiment, the external server 120 requests bookmarking information and passes the necessary data to fulfill the request to the server 108, which receives the request in operation 2904. In this implementation, the information requested by the client device 104 is delivered to the client device 104 responsive to the request from the external server 120 in operation 2928. In this example, the server 108 additionally sends, in operation 2928, an acknowledgement of the delivery of the viewer measurement modified list data to the external server 120 that generated the request. If the request cannot be processed for any reason, the server 108 returns relevant error messages to the external server 120 and/or the client device 104 in operation 2928.

In another example, the request for viewer measurement modified list data may originate in a data feed 116. In this embodiment, the data feed 116 requests viewer measurement modified list data and passes the necessary data to fulfill the request to the server 108, which receives the request in operation 2904. In this implementation, the information requested by the client device 104 is delivered to the client device 104 responsive to the request from the data feed in operation 2928. In this regard, the data processing and aggregating server 108 may deliver the viewer measurement modified list data to the client device 104 with a update request from the data feed 116.

Timer Generation

A data processing and aggregating server 108 in accordance with at least one embodiment of the present disclosure may use a data feed to generate a timer. In at least one embodiment, the server 108 may use a data feed to generate a timer to record a DVR event. In at least one embodiment, a data feed initiates a request to create a recording on a DVR through the server 108. This data feed can generate this request to record an event on its own or if certain conditions of a user's profile are met. For example, a sporting event can be recorded if a user's favorite team is playing. A game can be recorded if it crosses a certain excitement level that may or may not be defined by a user. By way of further example and not limitation, a data feed that generates timers may do so based on certain events such as a favorite actor could be in the cast of the content, a trending event is being discussed, or a trending event in a piece of content could be on a list of topics generated or selected, manually or automatically, for a given user or users. A timer can be created for a specific piece of content available to the user or it could be for a particular period of time across a certain channel or within a piece of content.

Figure 30:
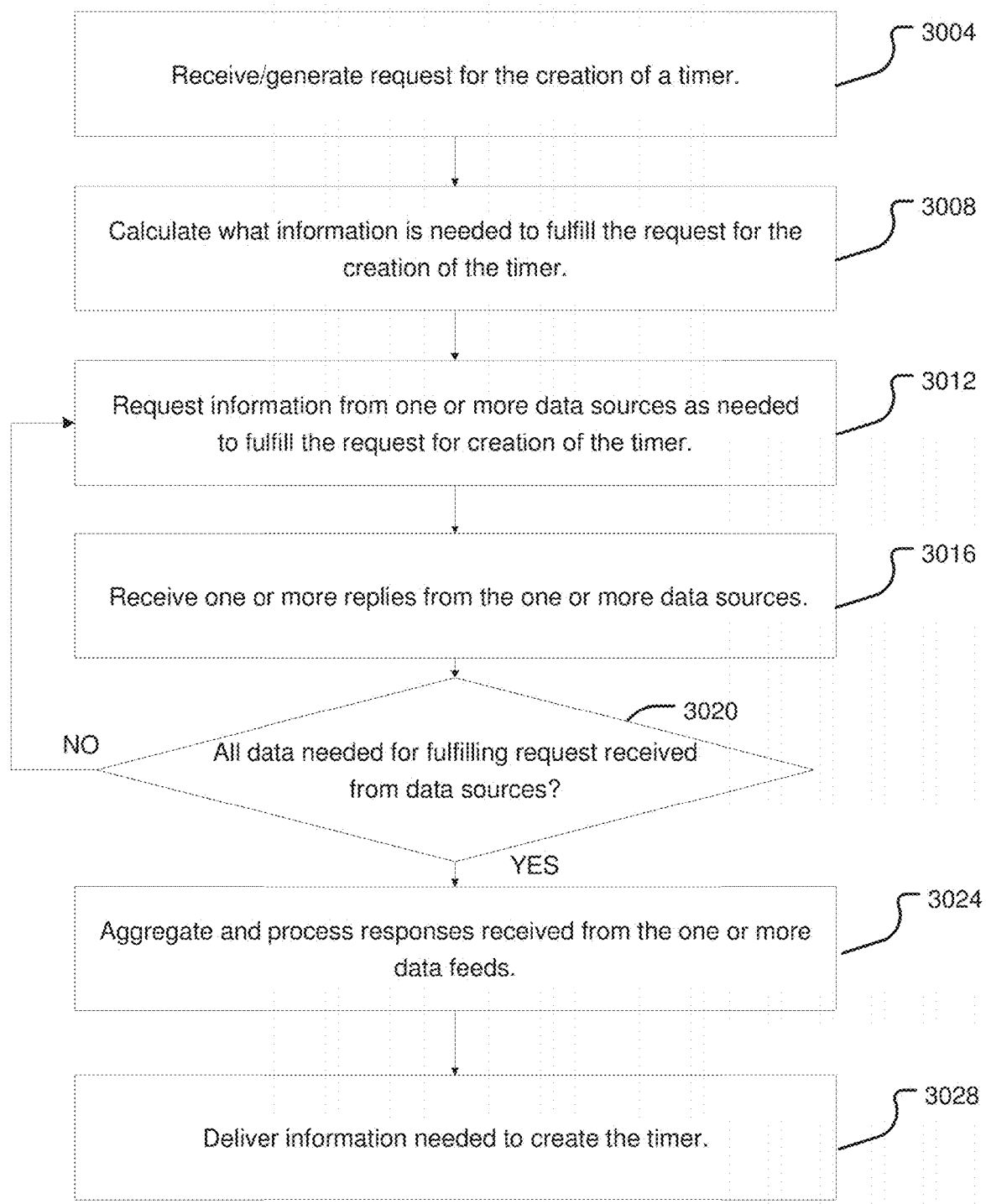
FIG. 30 depicts a flow chart illustrating a method of processing a request for creation of a timer in accordance with at least one of the present embodiments.

As shown in FIG. 30, a method of processing a request for creation of a timer, as depicted in flow chart 3000, may be executed by the server 108 or component thereof depicted in FIGS. 1 and 4. In operation 3004, the server 108 receives and/or generates a request for creation of a timer. In operation 3008, the server 108 determines what information is needed to fulfill the request for creation of a timer. In operation 3012, the server 108 requests information from one or more data sources as needed to fulfill the request for creation of a timer. In operation 3016, the server 108 receives one or more replies from the one or more data sources. The server may then repeat one or more of the above operations until the server determines that all information needed for generating the requested creation of a timer has been received. Thus, in operation 3020, the server 108 may determine if all data needed for fulfilling the request has been received from the data sources. If not, operation 3012 may again be executed following operation 3020. If so, operation 3028 may be executed following operation 3020. In operation 3024, the server 108 aggregates and processes the responses received from the one or more data feeds. In operation 3028, the server 108 delivers data for the requested creation of a timer to the client device 104.

In one example, the request for creation of a timer may originate in the client device 104. In this embodiment, the client device 104 requests creation of a timer and passes the necessary data to fulfill the request to the server 108, which receives the request in operation 3004. The data passed to the server in operation 3004 may include currently playing info, current position of play head, type of information requested, or the like. In this implementation, the information requested by the client device 104 is delivered to the client device 104 responsive to that request in operation 3028. Additionally, if the request cannot be processed for any reason, the server 108 returns relevant error messages to the client device 104 in operation 3028.

In another example, the request for creation of a timer may originate in the server 108. In this embodiment, the data processing and aggregating server 108 generates its own request to create a timer and initiates processing of that request in operation 3004. The request is then processed as described above in connection with at least one of the other embodiments, including operation 3028 where the data for the requested creation of a timer is delivered to the client device 104. Thus, in this example, the data processing and aggregating server 108 delivers data for the requested creation of a timer to the client device 104 without a direct request from the client device 104.

In another example, the request for creation of a timer may originate in an external server 120. In this embodiment, the external server 120 requests bookmarking information and passes the necessary data to fulfill the request to the server 108, which receives the request in operation 3004. In this implementation, the information requested by the client device 104 is delivered to the client device 104 responsive to the request from the external server 120 in operation 3028. In this example, the server 108 additionally sends, in operation 3028, an acknowledgement of the delivery of the data for the requested creation of a timer to the external server 120 that generated the request. If the request cannot be processed for any reason, the server 108 returns relevant error messages to the external server 120 and/or the client device 104 in operation 3028.

In another example, the request for creation of a timer may originate in a data feed 116. In this embodiment, the data feed 116 requests creation of a timer and passes the necessary data to fulfill the request to the server 108, which receives the request in operation 3004. In this implementation, the information requested by the client device 104 is delivered to the client device 104 responsive to the request from the data feed in operation 3028. In this regard, the data processing and aggregating server 108 may deliver the data for the requested creation of a timer to the client device 104 with an update request from the data feed 116.

The technology described herein may be implemented as logical operations and/or modules in one or more devices systems and/or methods. The logical operations may be implemented as a sequence of processor implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of the various embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A user device comprising:
a storage device, storing non-transient computer instructions; and
a microprocessor coupled to the storage device;
wherein the non-transient computer instructions, when executed by the microprocessor, configure the user device to perform first operations comprising:
receiving bookmarking data from a server;
wherein the server initiates generation of and generates the bookmarking data independently of the user device;
wherein the bookmarking data includes a bookmark that identifies a specific point in a media content; and
wherein the bookmark is selectable by a user when presented on a display device coupled to the microprocessor;
monitoring a current playback position of the media content; and
when the current playback position of the media content is concurrent with a media content segment identified by the bookmark,
instructing a display device coupled to the microprocessor to display the bookmark on the display device at a first position on the display device.

2. The user device of claim 1,
wherein the first position is above a first location on a progress bar; and
wherein the first operations further comprise:
instructing the display device to display the bookmark when the current playback position of the media content coincides with the first location on the progress bar.

3. The user device of claim 1,
wherein the first position is within a list or a grid that includes two or more bookmarks.

4. The user device of claim 1,
wherein the bookmarking data identifies a segment of the media content by at least one of:
a title, start time, and stop time of the segment;
the title, location and length of the segment; and
the title and a category of indicators for the bookmark.

5. The user device of claim 4,
wherein the category of indicators includes at least one indicator of an activity on a progress bar as the activity occurs during a broadcast of the segment of the media content.

6. A user device comprising:
a storage device, storing non-transient computer instructions; and
a microprocessor coupled to the storage device;
wherein the non-transient computer instructions, when executed by the microprocessor, configure the user device to perform first operations comprising:
receiving bookmarking data from a server;
wherein the server initiates generation of and generates the bookmarking data independently of the user device;
wherein the bookmarking data includes a bookmark that identifies a specific point in a media content; and
wherein the bookmark is selectable by a user when presented on a display device coupled to the microprocessor;
monitoring a current playback position of the media content; and
when the current playback position of the media content is concurrent with a media content segment identified by the bookmark, instructing a display device coupled to the microprocessor to display the bookmark on the display device at a first position on the display device;
wherein the first operations further comprise:
presenting the media content; and
overlaying the bookmarking data on at least one segment of the media content.

7. The user device of claim 6,
wherein the bookmarking data includes:
 a title; and
 a list of descriptors.

8. The user device of claim 7,
wherein the media content includes a commercial segment having a beginning and an end; and
wherein the first operations further comprise:
 receiving a user selection of the bookmark; and
 advancing the media content to an end of the commercial segment.

9. A software architecture, encoded on at least one non-transitory computer readable medium, accessible by a user device, comprising:
a first process comprising first computer instructions which, when executed by a microprocessor in the user device, include:
 receiving bookmarking data from a server;
  wherein the server initiates generation of and generates the bookmarking data independently of the user device;
  wherein the bookmarking data includes a bookmark that identifies a specific point in a media content; and
  wherein the bookmark is selectable by a user when presented on a display device coupled to the microprocessor;
 monitoring a current playback position of the media content; and
 instructing a display device coupled to the microprocessor to display the bookmark on the display device at a first position on the display device when the current playback position of the media content is concurrent with a media content segment identified by the bookmark.

10. The software architecture of claim 9, further comprising:
a second process comprising second computer instructions which, when executed by a microprocessor in the user device, include:
 based on the bookmarking data, outputting an output signal; and
  wherein the output signal causes a display device to display the bookmark.

11. The software architecture of claim 10,
wherein the bookmark includes a user selectable portion and a descriptive portion.

12. The software architecture of claim 11,
wherein the descriptive portion includes a title of a segment of the media content and at least one of:
 a time location and length of the segment; and
 a start time and a stop time of the segment.

13. The software architecture of claim 10,
wherein the output signal instructs the display device to display the bookmark as a pop-up overlay of a presentation of the media content.

14. The software architecture of claim 9,
wherein the media content includes a commercial segment having a beginning and an end; and
wherein the first computer instructions further include:
 receiving a user selection of the bookmark; and
 advancing the media content to an end of the commercial segment.

15. A method comprising:
receiving bookmarking data, by a user device and from a server; and
 wherein the server initiates generation of and generates the bookmarking data independently of the user device; and
 wherein the bookmarking data includes a bookmark that identifies a specific point in a media content;
outputting, in a first output signal, the bookmark to a display device coupled to a processor in the user device;
 wherein the bookmark is selectable by a user when presented on a display device coupled to a microprocessor;
monitoring a current playback position of the media content; and
instructing a display device coupled to the microprocessor to display the bookmark on the display device at a first position on the display device when the current playback position of the media content is concurrent with a media content segment identified by the bookmark.

16. The method of claim 15,
wherein the server further generates the bookmarking data based on user profile information associated with a user of the user device.

17. The method of claim 15,
wherein the media content includes a commercial segment having a beginning and an end; and
the method further comprising:
 receiving a user selection of the bookmark; and
 advancing the media content to an end of the commercial segment.

18. The method of claim 15,
wherein the bookmarking data identifies a segment of the media content by at least one of:
 a title, start time, and stop time of the segment;
 the title, location, and length of the segment; and
 the title and a category of indicators for the bookmark.

19. The method of claim 15,
wherein the bookmark includes a user selectable portion and a descriptive portion.

20. The method of claim 19,
wherein the first output signal instructs the display device to display the bookmark as a pop-up overlay of a presentation of the media content.

* * * * *